(12) United States Patent
Finan et al.

(10) Patent No.: US 7,856,026 B1
(45) Date of Patent: Dec. 21, 2010

(54) CONFIGURABLE CENTRAL MEMORY BUFFERED PACKET SWITCH MODULE FOR USE IN A PLD

(75) Inventors: Christopher D. Finan, Cupertino, CA (US); Ziad Abu-Lebdeh, San Jose, CA (US)

(73) Assignee: Altera Corporation, San Jose, CA (US)

( * ) Notice: Subject to any disclaimer, the term of this patent is extended or adjusted under 35 U.S.C. 154(b) by 812 days.

(21) Appl. No.: 11/169,972

(22) Filed: Jun. 28, 2005

(51) Int. Cl.
H04L 12/56 (2006.01)
(52) U.S. Cl. ............ 370/412; 370/413; 370/422
(58) Field of Classification Search ............ None
See application file for complete search history.

(56) References Cited

U.S. PATENT DOCUMENTS

| 6,456,590 | B1* | 9/2002 | Ren et al. ............ 370/229 |
| 6,678,877 | B1* | 1/2004 | Perry et al. ............ 716/15 |
| 7,076,595 | B1* | 7/2006 | Dao et al. ............ 710/317 |
| 2002/0048280 | A1* | 4/2002 | Lee et al. ............ 370/468 |
| 2003/0063618 | A1* | 4/2003 | Khacherian et al. ........ 370/413 |
| 2004/0179542 | A1* | 9/2004 | Murakami et al. .......... 370/413 |
| 2005/0278682 | A1* | 12/2005 | Dowling ............ 716/18 |
| 2006/0140126 | A1* | 6/2006 | Zhong et al. ............ 370/241 |
| 2006/0291458 | A1* | 12/2006 | Liu et al. ............ 370/375 |

OTHER PUBLICATIONS

Altera®, Atlantic Interface, Functional Specification 13, Jun. 2002, ver. 3.0, pp. 1-10.

* cited by examiner

Primary Examiner—Jayanti K Patel
Assistant Examiner—Anthony Sol
(74) Attorney, Agent, or Firm—Weaver Austin Villeneuve & Sampson LLP

(57) ABSTRACT

Modules and methods are described for buffering packets to be switched in a system, such as a programmed device. The modules can be configured for different packet lengths, protocols, applications, and/or designs in a larger system. Techniques and mechanisms are further described for implementing a central memory and a linked-list addressing scheme. Accordingly, memory blocks of the central memory can be used for variable length packets and further reused at substantially the same time as they become available, thereby improving packet switching efficiency and/or flexibility.

42 Claims, 11 Drawing Sheets

CONFIGURABLE CENTRAL MEMORY BUFFERED PACKET SWITCH MODULE FOR USE IN A PLD

BACKGROUND

1. Field of the Invention

The present invention generally relates to packet switches. More specifically, the invention relates to apparatus and methods for buffering packets by implementing a central memory buffered packet switch.

2. Description of Related Art

A packet switch is often used to facilitate delivery of packets in a system (e.g., telecommunication, networking, programmable device, etc.). The packet switch is operable to channel incoming data from one of multiple input ports to a specific output port, which will route the data towards its intended destination.

Packet switches are available in different configurations. One configuration uses an input buffering technique, which allows head of line packets contending for the same output port to reside in respective input buffers where they can be routed one at a time to the output buffer. Although input buffering controls the problem of contention, head of line blocking may occur. That is, these head of line packets may block other packets behind them while waiting for their turn to be routed to the output buffer. This is of concern when other packets in the back of the line are destined for output ports that are readily available for receiving them. In order to mitigate head of line blocking, another configuration includes an output buffering technique. However, this technique requires faster internal switching. It may also produce "backpressure" on specific input ports when a single output buffer is full. Still another configuration employs a central buffering memory to increase internal switching efficiency. Although this technique can work well, to date it has been limited to processing packets according to specific protocols, fixed lengths, custom application-specific integrated circuit (ASIC) designs, or application-specific standard product (ASSP) designs. In addition, configurability for high packet throughput is difficult.

In view of the foregoing, an improved packet switching technique and apparatus would be highly beneficial.

SUMMARY

Methods and apparatus are provided for low latency switching of packets in a system. A buffered packet switch can be configured to handle packets of fixed or variable length, and be optimized to a particular application, design, or protocol. A central memory architecture facilitates high packet throughput.

Buffered packet switch modules and buffering methods of this invention may be implemented with a central memory and an indirect addressing scheme (typically implemented using a linked list of packet addresses in the central memory). In one embodiment, the central memory is divided into blocks available for use by particular input ports to buffer packets. A block is used by an input port for a period of time and then freed up for use by another port. The buffered switch module may also support virtual channels in which a given port or ports supports multiple different virtual flows, each having its own characteristics such as available bandwidth, packet type, quality of service (QoS) setting, etc. Individual packets of a virtual queue may be arranged as a link list and stored over multiple memory blocks in the central memory.

Another aspect of the invention pertains to electronic design automation (EDA) allowing users to design electronic devices having buffered packet switch modules optimized and arranged for use in particular applications. EDA methods, software, and apparatus facilitate entry of such designs by providing parameterizable buffer switch modules. Examples of parameters that may be specified by designers include the number of input and output ports, the bit width of the data path for each input and output port, the amount of buffer space allocated to each input port, the number of virtual channels for each output port, and scheduling of port access to central memory.

Another aspect of the invention pertains to a programmable chip that includes a packet switch module. The packet switch module is operable to interconnect a first component module and a second component module. The packet switch module includes input ports, output ports, and a switch matrix. The input ports are operable to receive packets from the first component module. The output ports are operable to transmit the packets to the second component module. The switch matrix is operable for directing the packets between the input ports and the output ports. The switch matrix includes a Central Data Buffer with memory blocks operable to store temporarily the packets after their receipt by the input ports. The memory blocks are managed in an indirect addressing scheme such that free memory blocks are made available to any input port requiring packet buffering.

A further aspect of the invention pertains to computer program products including machine-readable media on which are provided program instructions and/or arrangements of data for implementing the switch modules and buffering methods described herein. Frequently, the instructions are provided as code for performing certain operations. Data, if employed to implement features of this invention, may be provided as data structures, data objects, or other appropriate arrangements of stored information. These may represent various features of the module such as ports, central memory, control logic, and the like. In many contexts, the methods or other features of this invention may be represented, in whole or in part, as such program instructions and/or data provided on machine-readable media.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1:
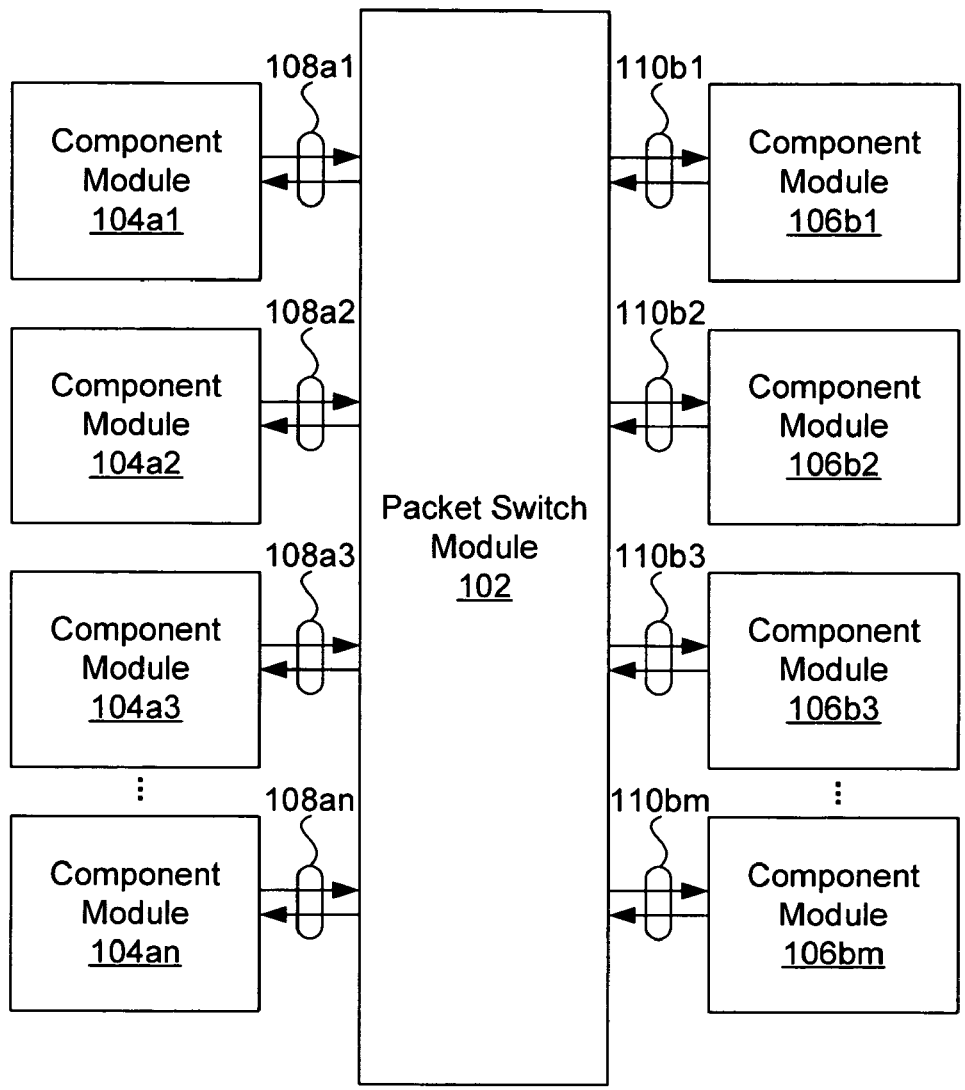
FIG. 1 is a diagrammatic representation of a Packet Switch Module interconnecting multiple component modules according to various embodiments of the present invention.

The present invention will now be described in detail with reference to a preferred embodiment thereof as illustrated in the accompanying drawings. In the following description, specific details are set forth in order to provide a thorough understanding of the present invention. It will be apparent, however, to one skilled in the art, that the present invention may be practiced without using some of the implementation details set forth herein. It should also be understood that well known operations have not been described in detail in order to not unnecessarily obscure the present invention. Further, it should be noted that the techniques of the present invention could be applied to a variety of systems or electronic devices such as programmable devices and application-specific integrated circuit (ASIC) devices.

Techniques and buffer architectures are described for switching packets in a system, such as a programmable device system. The packets can be associated with different lengths, protocols, applications, and/or designs in the system. Techniques and mechanisms are further described for implementing a central memory that supports multiple virtual channels using a linked-list addressing scheme. Further, memory blocks of the central memory can be used for variable length packets and reused at substantially the same time as they become available, thereby enabling packet switching efficiency and/or flexibility.

In general, packets may be stored in particular memory locations and accessed from those locations using an indirect addressing scheme. The buffering switch modules of this invention may employ a central memory that is divided into memory blocks, each of which is in either a used state (buffering packets) or a free state (no packets currently being buffered). Whenever a memory block becomes free, it is made available to whichever input port that requires memory to buffer its packets. According to various embodiments of the present invention, a Data Buffer Memory Manager (DBMM) provides a series of available (free) Central Data Buffer (CDB) memory blocks that can be used to store incoming packets. Associated with each free memory block is a pointer to the next memory block, thereby creating a linked-list of available CDB memory blocks where packets can be written. Viewed another way, memory is made available to input ports via a FIFO of free memory blocks. As memory blocks are used, a Virtual Output (Channel) Queue Manager (VOQM) constructs a linked-list of packets (using, e.g., start of packet addresses) within the CDB memory blocks. The VOQM can follow the links to where the stored packets can be read and provide consecutive data to the output ports.

The buffered packets may belong to multiple virtual queues, each defining a separate flow. The individual packets belonging to a particular virtual queue are associated with one another, in a defined order, by a linked-list of pointers pointing to the various memory locations of the packets. The packets of a virtual queue may be distributed throughout the central memory in various locations, regardless of how the corresponding memory blocks are physically ordered/arranged in the memory. For instance, pointers for consecutive packets might point to memory locations that do not correspond to memory blocks that are contiguous to each other. A memory location may identify a memory block that contains either the complete packet or a portion thereof. Thus, the indirect addressing scheme employed to associate individual packets of a virtual queue avoids head of line blocking and provides efficient reuse of freed memory blocks.

In some ways, the "linked-list addressing scheme" of the present invention can also be herein referred to as an "indirect addressing scheme". It is "indirect" in the sense that it may not be directly known where the rest of a packet or virtual queue of packets is located given the packet's starting memory location. Instead, by following the pointers, the complete packet is indirectly provided.

In a programmable device system, various components are employed to facilitate the implementation of an electronic design on an electronic device. In some examples, components may include intellectual property functions, megafunctions, and intellectual property cores. According to various embodiments of the present invention, these components are pre-programmed and/or pre-verified programmable logic operable to perform a particular task/function. Many components are available as modules that may be stored in and retrieved from a library or database.

In general, the term "electronic design" refers to the logical structure of an electronic device such as an integrated circuit or a portion of the device. It may be implemented in hardware (usually referred to herein generically as a "target hardware device"). During the design and development effort, an electronic design may exist in various states or stages. These may include a high level Boolean representation (encoded in a hardware design language for example), a schematic or circuit representation, or any other form representing the logical arrangement of a device. In addition to the circuit structure and behavioral descriptions, the electronic design may specify other details such as floor-plan constraints, waveform constraints, timing constraints, fitting constraints, etc. At the gate level, it may exist as a netlist (whether synthesized or not) prior to placement on a target hardware device. Alternatively, it may include completed place and route assignments.

While the invention is particularly shown and described with reference to specific embodiments thereof, it will be understood by those skilled in the art that changes in the form and details of the disclosed embodiments may be made without departing from the spirit or scope of the invention. For instance, embodiments of the present invention may be employed with a variety of memory components and should not be restricted to the ones mentioned herein. In general, memory components can be categorized into different memory block sizes/ranges. Any suitable categorization may be implemented depending on the application. For example, a small RAM block may include sizes in the range between 512 bits to 2048 bits (2 Kb), such as the M512 used herein. A medium RAM block may include sizes in the range between 4096 bits (4 Kb) to 16,384 bits (16 Kb), such as the M4K used herein. A large RAM block may include sizes in the range between 32,768 bits (32 Kb) to 4,194,304 bits (4 Mb), such as the MRAM used herein. These ranges can be changed depending on the application.

In order for various components of an electronic design to communicate with one another, mechanisms and techniques for delivering packets between the various components are used. For example, FIG. 1 is a diagrammatic representation of a Packet Switch Module 102 interconnecting multiple component modules (i.e., modules 104a(1-n) and 106b(1-m)) according to various embodiments of the present invention. Packet Switch Module 102, component modules 104a(1-n), and component modules 106b(1-m) can be located together on a single hardware device or separately on multiple hardware devices. It will be appreciated by those skilled in the art that Packet Switch Module 102 can be configured to interconnect any suitable number of component modules 104a(1-n) and 106b(1-m). For instance, depending on the application, the number of component modules 104a and the number of component modules 106b may either be the same (n=m) or different (n≠m).

In general, Packet Switch Module 102 is operable to receive packets from one or more component modules 104a (1-n) via corresponding interconnects 108a(1-n) and forward them to one or more component modules 106b(1-m) via corresponding interconnects 110b(1-m). In the context of this invention, components may communicate with each other by sending and/or receiving packets of information (e.g., data, requests, responses, etc.). Some components may be configured to initiate the communication whereas others wait until they are contacted. Accordingly, each of the component modules 104a and 106b can have any suitable number of output ports for sending information and/or input ports for receiving information. For instance, component module 104a1 may have two output ports for sending packets to Packet Switch Module 102 and one input port for receiving control information from Packet Switch Module 102. In addition, any suitable number of interconnects within interconnects 108a and 110b can be used to interconnect each of the component modules 104a and 106b with Packet Switch Module 102. For instance, each interconnect can correspond to an output/input port of a component module 104a or a component module 106b.

Each packet has an associated destination. For example, a packet from component 104a1 may have a destination in component module 106b2. Packet Switch Module 102 facilitates the forwarding of packets from components 104a(1-n) to components 106b(1-m) by buffering packets at high bandwidth, thereby reducing or eliminating the need for buffering in attached ports or adjacent component modules. Other logical functions of packet switching such as determining appropriate output ports for each packet are generally implemented outside the buffer logic described herein. However, such logic may be combined with the buffer module of this invention to form an overall switch core or other IP block. In the example of FIG. 1, a packet's destination is provided/determined outside of Packet Switch Module 102 at, e.g., component module 104a1. It should be noted that Packet Switch Module 102 could be used to switch packets between a single pair of components (e.g., 104a1 and 106b2) or multiple pairs of components (e.g., 104a1 and 106b1; 104a2 and 106b1; 104a1 and 106b2; etc.).

Components may be configured with interfaces to facilitate proper communications between them. The interfaces may include any number of ports for communicating and suitable logic for managing the communication. For example, component modules 104a(1-n), 106b(1-m) and/or Packet Switch Module 102 may include interface logic for transferring packetized data from one module to another. Such logic may control handshaking between interfacing modules during data transfer. A specific example of such logic is provided with an "Atlantic" interface, provided by Altera Corporation of San Jose, Calif. for linking its EP modules. The Atlantic Interface is briefly described in Atlantic Interface Functional Specification 13, Altera Corporation, June 2002, ver. 3.0, which is available at http://www.altera.com/literature/fs/fs-_atlantic.pdf, the contents of which are herein incorporated by reference. Preferably, such interfaces are scalable, high-speed on-chip interfaces for packet and cell transfer. They may be optimized for programmable logic devices (PLDs), and allow designers to join otherwise incompatible devices or modules. As an example, the Atlantic interface is a synchronous point-to-point connection for the packet data. Its scalable clock frequency and data bus width allow for high throughput of arbitrary length packets. The Atlantic interface supports master source-to-slave sink, or master sink-to-slave source relationships. Control signals and fixed start of packet (SOP) alignment are available for packet handling and flow control. Of course, other interface logic may be employed as appropriate for the particular programmable logic device or ASIC under development.

Figure 2:
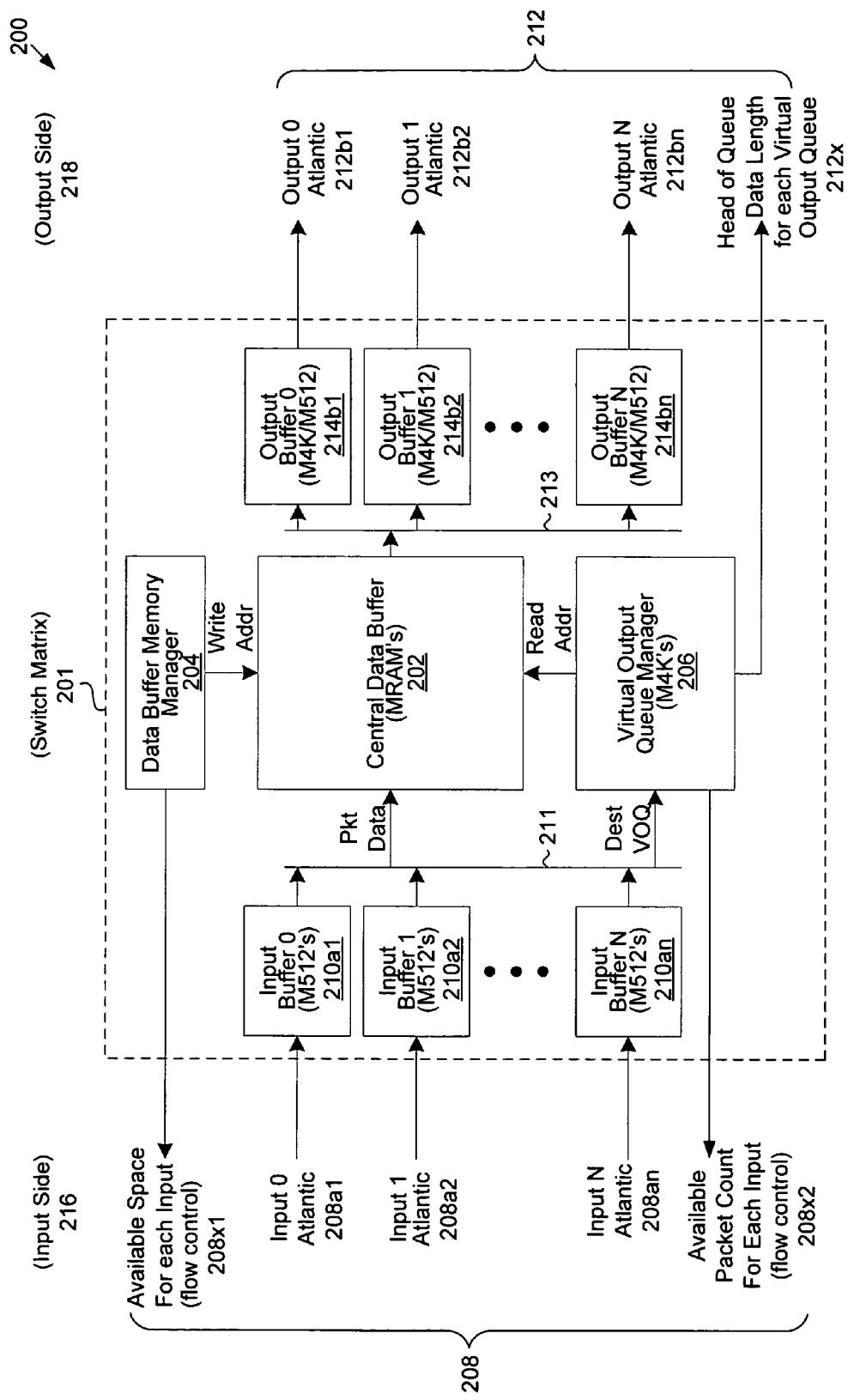
FIG. 2 illustrates a Packet Switch Module according to various embodiments of the present invention.

In typical embodiments, the packet switch module of this invention can switch variable length packets of any type. Preferably, the module is made available to device designers through an EDA environment such as one employing Altera Corporation's Quartus II Software Version 5.0. When presented to designers, the module may be configurable to suit many different applications. To further elaborate, FIG. 2 illustrates a Packet Switch Buffer Module 200 according to various embodiments of the present invention. The buffering is implemented using a central memory configuration. The packets that arrive from the input ports are written into a central memory. A destination address is usually supplied with each packet. The central memory address of the start of a packet is placed on a queue assigned for the destination address. When the packet reaches the head of the destination queue, the destination can start reading the packet out of the central memory.

As shown in FIG. 2, Packet Switch Module 200 includes multiple ports 208 and 212. Ports 208 are operable to communicate with a first component module (e.g., module 104a1) whereas ports 212 are operable to communicate with a second component module (e.g., module 106b1). Any number of input ports 208a (e.g., 208a1, 208a2, . . . 208an) may be employed. Likewise, any number of output ports 212b (e.g., 212b1, 212b2, . . . 212bn) may be employed. Input ports 208a are operable for receiving packets whereas output ports 212b are operable for transmitting packets. Other communications to adjacent modules may take place via miscellaneous connections or ports such as connections 208x1, 208x2, and 212x, which are individually operable either for receiving data, transmitting data, or both. Input ports 208a can be connected to corresponding input buffers 210a (e.g., 210a1, 210a2, . . . 210an) and output ports 212b can be connected to corresponding output buffers 214b (e.g., 214b1, 214b2, . . . 214bn).

Packet Switch Module 200 also includes a Switch Matrix 201 having a Central Data Buffer (CDB) 202 for connecting with input buffers 210a and output buffers 214b as well as with a Data Buffer Memory Manager (DBMM) 204 and a Virtual Output Queue Manager (VOQM) 206. DBMM 204 and VOQM 206 are provided with miscellaneous connections 208x1, 208x2 and 212x. As shown in FIG. 2, miscellaneous port 208x1 can be used for transmitting information regarding the available CDB space allocated to each input port 208a and miscellaneous port 208x2 can be used for transmitting information regarding the Available Packet Count for each input. As will be discussed below, the information can be used for flow controlling the incoming packets. Miscellaneous port 212*x* can be used for transmitting information regarding the head of queue packet length for each virtual output queue.

CDB 202 is where packets are buffered as they are in progress from input ports 208*a* to output ports 212*b*. Each input port has a dedicated amount of CDB space available for use. In embodiments described herein, that space is provided as physical memory blocks, each of which is temporarily available to a given input port, which provides its packets to locations within the block during a given write cycle. Later, when all packets are drained from the block, it becomes available again for use by any of the input ports. Memory blocks are not associated with any specific input port, but a given input port can never, at any given instant in time, have more than a pre-defined maximum number of blocks available for its packets.

When a target output port is ready for the packet, it is read out of the CDB. An indirect addressing scheme is used so that the blocks of the CDB space can be reused as soon as they are freed. The packets need not be freed up in a first-in-first-out (FIFO) order, since some packets may be destined for outputs that are not congested and thus could be freed up before packets that arrived earlier that were destined for more congested outputs. As such, head of line blocking can be avoided.

In some embodiments, the clock rate and data width of CDB 202 may be set so that it could accept packets from all of the inputs at full line rate in a substantially continuous manner. It also may be able to source data to the output ports at full line rate. In this way, the interface ports (e.g., ports of component modules 104*a*1 and 106*b*1) do not need to provide their own packet buffering but instead can rely on access to CDB 202 to support their full line rates. However the interfaces may need to be flow controlled so that a given input does not run out of input buffer space. This is because there may be output port contention or flow control issues that cause the input buffer spaces to not empty out at the same rate as the incoming rate. To this end, the available memory space for each input can be provided to flow control logic from DBMM 204 via connection 208*x*1. Similarly, the available packet count for each input can be provided to flow control logic from VOQM 206 via connection 208*x*2. In many embodiments of this invention, flow control logic is provided outside (usually upstream from) Buffered Switch Module 200.

Embodiments of the present invention provide the ability to flow control under different conditions. For example, if the input component has recently sourced a few large packets into the CDB and that have not been transferred to the outputs, the Available Memory Space (from DBMM) may be nearing 0 even though the Available Packet Count (from VOQM) may be much greater than 0. In this case, the input component would need to take flow control actions based on the limited Available Memory Space. Conversely, if the input component has recently sourced a large number of small packets into the CDB and that have not been transferred to the outputs, the Available Packet Count (from VOQM) may be nearing 0 even though the Available Memory Space (from DBMM) may be much greater than 0. In this case, the input component would need to take flow control actions based on the limited Available Packet Count.

CDB 202 can be configured so that in a given input cycle, an entire input data bus 211 can be dedicated to a given input port. Some embodiments employ a round robin access scheme that guarantees specified line rates for each input. The round robin access scheme can be defined by scheduling configuration parameters, which will be discussed in detail below. Briefly, the access time available to each port employed in the round robin method can be a fixed or weighted value. A similar scheme can be used for the output side of the CDB. Thus, an output data bus 213 can be dedicated to one output port interface in a given cycle. The output round robin access scheme can also be provided by the scheduling configuration parameters. The CDB clock frequency, data width and round robin scheduling can be custom designed for the set of busses connected to a given switch.

CDB 202 can have the ability to enable and disable writes on 32 bit (4 byte) boundaries, or any suitable bit boundary that provides sufficient granularity for the attached interfaces. For example, PCI-Express and HyperTransport use 4 bytes as the packet size boundaries. Individual byte enables for finer granularity than that are generally carried in the packet headers.

Input buffer 210*a* is generally a simple FIFO that holds data until the correct time slot is available for writing into CDB 202. Input buffer 210*a* may be sized to buffer the amount of data that could accumulate until the next slot becomes available. According to one embodiment, an M512 based FIFO (provided on, for example, an Altera Stratix family device) or similar memory hardware is employed for each input buffer 210*a*. Furthermore, input buffers 210*a* can be augmented on their outputs with registers that fan out the incoming bit width to the actual CDB width.

In some embodiments, it is the responsibility of input buffers 210*a* to match the actual input rate to the fixed CDB access cycles. If the input port does not have data in a given cycle, then the CDB write enables are suppressed and the CDB memory address is not incremented. Further, input buffers 210*a* can be responsible to smooth out the data flow. Note that a current memory block address is maintained for each input buffer. This address is taken from the list of free memory blocks and assigned to the input buffer in question. According to a specific embodiment, the current memory block address remains there for the input buffer until the input buffer has packet data to buffer, at which time it is replaced by the address of the next free memory block assigned by the DBMM 204.

In the presented embodiment, output buffers 214*b* are more complex than input buffers 210*a*. While they can serve the function of buffering the full amount of data received in an allocated CDB access slot until the actual interface (e.g., component module 106*b*1 interface; output port interface) can drain the data, they may need to provide this same function for several possible output queues (e.g., virtual output queues) per output port 212*b* at the same time. A mechanism for accomplishing this efficiently and at high bandwidth will be described below.

DBMM 204 may be responsible for allocating blocks of CDB storage to input ports 208*a*. Since data arriving from a given input port is not guaranteed to be read out of the CDB in a strict FIFO order, an indirect addressing scheme is used so that CDB memory locations can be reused immediately after they are freed. Thus, there is no need to wait for packets that arrived earlier to be freed up.

DBMM 204 can be configured to maintain the status of each CDB memory block as being in the available state or the used state. Initially all of the CDB blocks are in the available state. Since each input port can be configured to have a set number of CDB blocks assigned to it, DBMM 204 can maintain a count of CDB blocks currently available for each input port. At reset time this counter can be initialized to the number of CDB blocks assigned to this port.

When an input port 208*a* needs a CDB block to write data to, one of the currently available CDB blocks can be assigned to it and an available CDB block counter for that port will be decremented. The CDB block then will be put in the used state. When all data is read out of the CDB block by output port 212*b*, the CDB block will be returned to the available state and the available CDB block counter for the input port that wrote the data to the block will be incremented. The currently available CDB block count can be provided to the input port logic interface (via, e.g., connection 208*x*1 to an interface with component module 104*a*1) that is attached to the Packet Switch Module 200. The input port logic is responsible for making sure that the allocated CDB buffer space is not overrun by whatever means it can, such as flow controlling the incoming data when the available buffer space is running low.

VOQM 206 defines multiple virtual output queues (VOQ). Each VOQ is operable as a FIFO list of packets that is destined for a specific virtual output on a given output port. As packets arrive in Packet Switch Module 200 they are queued in a VOQ according to their identified flows and targeted designations. Each VOQ is drained in a first in, first out order. VOQM may also keep track of the available packet space for each input port (based on the numbers of packets currently stored in the CDB by each input port).

As mentioned earlier, components may include appropriately integrated interfaces. Associated with these interfaces are corresponding signals and logic. For instance, the input side 216 of the packet switch module may include the following signal groups for each input port:

Port clock input—Clock to be used for this input interface. Remaining signals in this section are synchronous to this clock An interface for transferring packets into the switch (e.g., an Atlantic interface, available from Altera Corporation of San Jose, Calif.)—For an Atlantic Slave Sink input, the attached module will have an Atlantic Master Source output Destination output port and virtual output queue for each packet—An optional interface address bus signal, "adr", can be used to pass the destination as, e.g., a concatenation of the output port and the virtual output queue.

Packet Length—Optionally the length of the packet can be passed on a defined interface bus. This can be used for calculating downstream flow control credit consumption in cut through routing cases.

Available buffer space—The amount of currently available space in the CDB can be provided to each input port. The attached cores (e.g., component modules) can allocate this to the appropriate packet types and virtual channels.

Available packet space—The amount of currently available space for additional packet headers. The attached cores can allocate this to the appropriate packet types and virtual channels.

Similarly, the output side 218 of the packet switch module may include the following signal groups for each output port:

Port clock input—Clock to be used for this output interface. Remaining signals in this section are synchronous to this clock.

Module interface for transferring packets out of the switch—For Atlantic Slave Source outputs, attached modules will have Atlantic Master Sink inputs.

Separate DAV (Data Available) and ENA (Enable) signals for each virtual output queue configured for the output port—An interface to allow multiple virtual interfaces over a single data path with the interface Master controlling which virtual interface is serviced at any point in time. DAV and ENA are signals that are part of the Atlantic Interface. In general, the output port asserts the DAV signal indicating that it has data for that virtual output queue. The ENA input signal is used by the interface Master to control from which virtual output queue data is sought in the next cycle.

Head of queue packet length—Along with each DAV signal, the length of the packet at the head of the virtual output queue can be provided along with a length valid flag. If the input port that transferred the packet in does not provide the packet length, then the length may be invalid.

Current depth (in packets) for each virtual output queue—can be used in output port scheduling algorithms.

Moreover, there may be general signals (not port specific) associated with the interfaces as follows:

Central Data Buffer Clock—Clock to be used for the Central Data Buffer, Data Buffer Memory Manager, and Virtual Output Queue Manager.

Master reset—resets all of the logic in the Packet Switch Module.

According to various embodiments, Packet Switch Module 200 is defined during an EDA product development during which a variety of configuration parameters are set. In such embodiments, Packet Switch Module 200 can be integrated in different applications, designs, and systems. General configuration parameters (not port specific) can include but are not limited to: Bit width of Central Data Buffer; Number of Input Ports; Number of Output Ports; Scheduling of Input Port access to the Central Data Buffer; Scheduling of Output Port access to the Central Data Buffer; Bit width of an address bus signal "adr", that is the concatenation of the destination output port and the virtual output queue number; and Bit width of the packet length, "len", extension to the interfaces.

In addition, Input port specific configuration parameters can include but are not limited to: Bit width of Input Port data path; Depth of the Input Port FIFO (in units of the Input Port data path bit width); Total amount of Central Data Buffer space assigned to this input port (the sum of these values across all input ports is generally the total size of the Central Data Buffer); and Total number of packets that can be queued from this input port at any one time (the sum of these values across all input ports is the total number of packets that needs to be managed in the Virtual Output Queue manager). Output port specific parameters can include but are not limited to: Bit width of Output port data path; Number of Virtual Output Queues for this output port; and Size of virtual FIFO for each of the Virtual Output Queues.

In FIGS. 3-6, example implementation details of a Packet Switch Module are provided. It should be understood these examples are representative only, and that the invention is not limited by the detail set forth in these examples.

Figure 3:
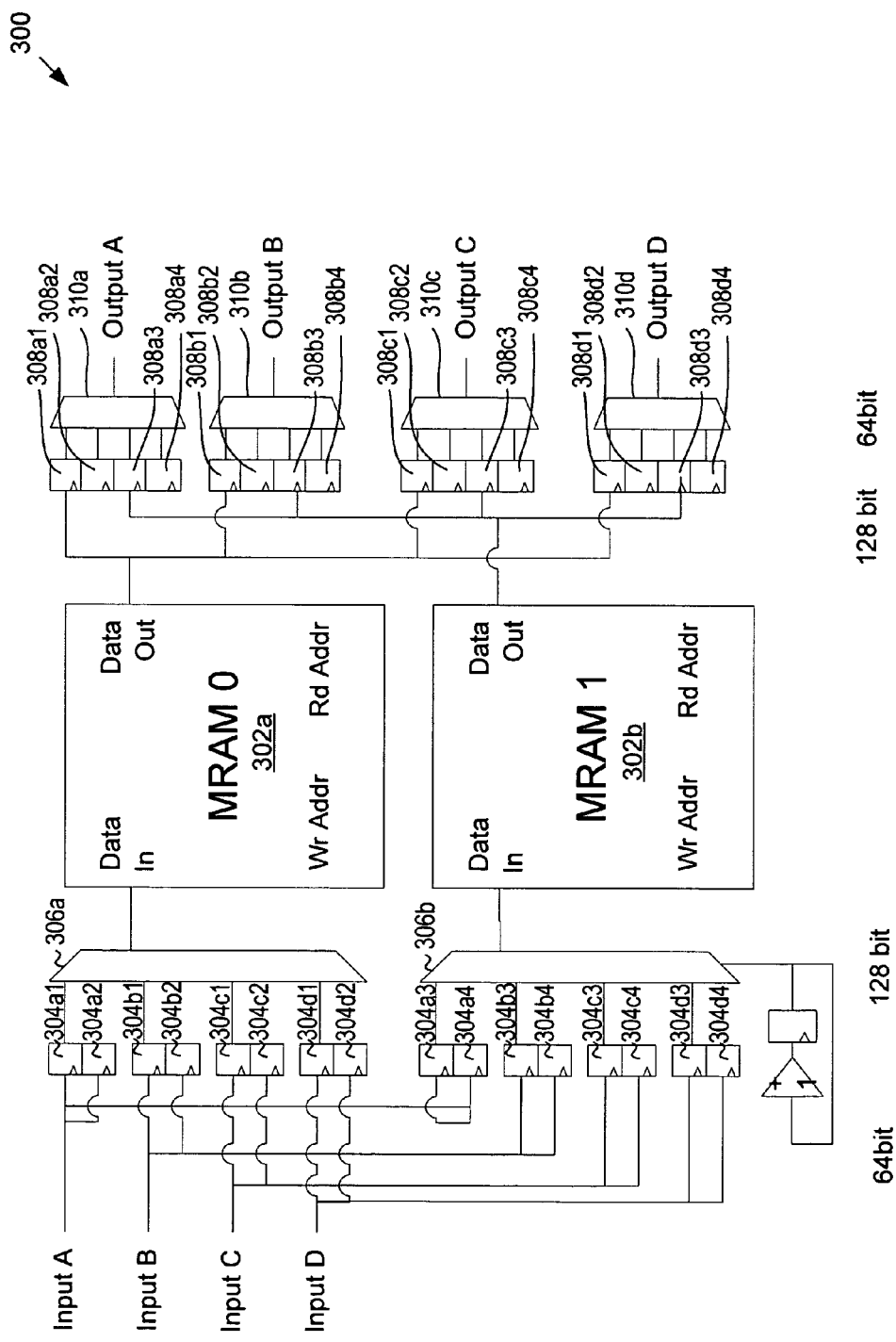
FIG. 3 illustrates an example implementation detail of a Central Data Buffer according to various embodiments of the present invention.

To begin, FIG. 3 illustrates an example implementation detail of a Central Data Buffer 300 according to a specific embodiment of the present invention. The functions of a Packet Switch Module of this invention can be implemented in various hardware configurations. If these functions are defined using programmable logic the hardware configuration depends in part on the hardware blocks available in the unprogrammed target hardware device. In the example of FIG. 3, the target hardware device may be, for example, an Altera Stratix-GX device (available from Altera Corporation of San Jose, Calif.). Note that this figure does not show the input buffers 210*a* or output buffers 214*b* of the Module.

In this example, CDB 300 may be implemented with a PCI-Express x4 interface. A PCI-Express x4 interface has four lanes that operate at 2.5 Gbps and thus requires four transceivers. A Stratix-GX device with 16 transceivers (indicated by reference numbers 304*a*(1-4), 304*b*(1-4), 304*c*(1-4), and 304d(1-4)) would support four PCI-Express x4 interfaces; i.e., four inputs identified as Inputs A through D in the figure. After accounting for the PCI-Express 8b/10b encoding scheme, each PCI-Express lane is capable of 2.0 Gbps. A four lane interface thus supports 8.0 Gbps. As the data arrives, it is split to produce a wider signal that can be clocked in to memory during a single cycle. So, for example, if the Central Memory can receive 256 bit wide input, and each transceiver is 64 bits wide, then data from Input A may be provided via four separate transceivers during a write cycle.

An 8.0 Gbps interface can be handled in a Stratix-GX device as a 64-bit/125 MHz interface. Thus, four 64-bit/125 MHz inputs to the Packet Switch Module and four 64-bit/125 MHz outputs result. This can then be structured as a CDB with 256-bit data busses operating at 125 MHz. Each interface could be dedicated the entire 256 bit input once every 4 cycles (assuming a fixed round robin access schedule). The same scheme could be used on the output side.

As shown in FIG. 3, CDB 300 with 256 bit interfaces can be constructed from two distinct memory units (MRAM blocks 302a and 302b) operating in parallel, each configured in 4K×128 bit mode (or 4K×144 bit mode if parity is desired). Each has a multiplexer 306 (i.e., 306a or 306b) for receiving write data from Inputs A through D, across eight transceivers 304 (i.e., 304a(1-2), 304b(1-2), 304c(1-2), 304d(1-2); 304a(3-4), 304b(3-4), 304c(3-4), 304d(3-4)).

As shown, a similar architecture is provided for Outputs A through D. Again, the output buffers 214b are not shown in this Figure. Transceivers 308a(1-4), 308b(1-4), 308c(1-4), 308d(1-4) and multiplexers 310 (i.e., 310a, 310b, 310c, 310d) operate to provide output packets in appropriate data width to the output buffers.

It is generally preferable, though not essential, that the two MRAM blocks 302a and 302b operate in parallel so that each output interface can have contention free access to data from any input. If instead a simplified input structure had MRAM 0 dedicated to two inputs, input A and input B, and MRAM 1 was dedicated to the other 2 inputs, C and D, there could be output contention. If for example outputs A and C needed to access packets that originally came from input B and outputs B and D needed to access packets that originated from input A, all of the outputs would be contending for MRAM 0 and the output bandwidth would be cut in half.

Other CDB configurations can be implemented. For example, the CDB can be implemented with two PCI-X 133 interfaces and two PCI-Express x4 interfaces. This scheme is essentially the same as the previous scheme except that the CDB would be set to run at 133 MHz so that it could keep up with a full rate input burst from the PCI-X interface (64 bits at 133 MHz). This would result in the PCI-Express interfaces periodically skipping write cycles even if they had full rate bursts occurring, since the actual data rate is only 64 bits at 125 MHz.

If it was not critical to be able to support very long bursts to or from the PCI-X interfaces, the CDB could still operate at 125 MHz and the actual PCI-X interfaces could have a modestly sized FIFO to speed match. If the input FIFO was close to filling or the output FIFO was close to emptying then "Disconnect at next ADB" could be signaled on the actual PCI-X interface. This would maintain correctness of operation on the PCI-X interface.

In another example, the CDB can be implemented with one PCI-X 133 Interface, one PCI-Express x8 interface, one PCI-Express x1 interface, and one HT 8-bit 400 MHz interface. The bandwidths for each of these interfaces are shown in Table 1 below.

TABLE 1

| Interface | Raw Bit Rate | Internal Data Path width | Internal Frequency |
|---|---|---|---|
| PCI-X 133 | 8.5333 Gbps | 64 bits | 133.333 MHz |
| PCI Express x8 | 16.0 Gbps | 128 bits | 125.00 MHz |
| PCI Express x1 | 2.0 Gbps | 16 bits | 125.00 MHz |
| HT 8-bits 400 MHz (DDR) | 6.4 Gbps | 64 bits | 100.00 MHz |

The total bandwidth required above is 32.9333 Gbps. This can again be met by a 256 bit wide two MRAM design running at 133.33 MHz (which actually provides 34.1333 Gbps). However the round robin scheduling many need to be a little more complex in this case. There would be 16 scheduling slots for the input (and output) to the MRAM. It may be best to assign the slots as spread out as possible for a given interface in order to minimize the depths of the Input and Output buffers. An example of the slot assignments is as shown in Table 2 below.

TABLE 2

| Interface | Raw Bit Rate | Slots | Percentage of slots | Assigned Bandwidth |
|---|---|---|---|---|
| PCI-X 133 | 8.5333 Gbps | 0, 4, 8, 12 | 4/16 | 8.5333 Gbps |
| PCI Express x8 | 16.0 Gbps | 1, 3, 5, 7, 9, 11, 13, 15 | 8/16 | 17.0667 Gbps |
| PCI Express x1 | 2.0 Gbps | 10 | 1/16 | 2.1333 Gbps |
| HT 8-bits 400 MHz (DDR) | 6.4 Gbps | 2, 6, 14 | 3/16 | 6.4000 Gbps |

Figure 4:
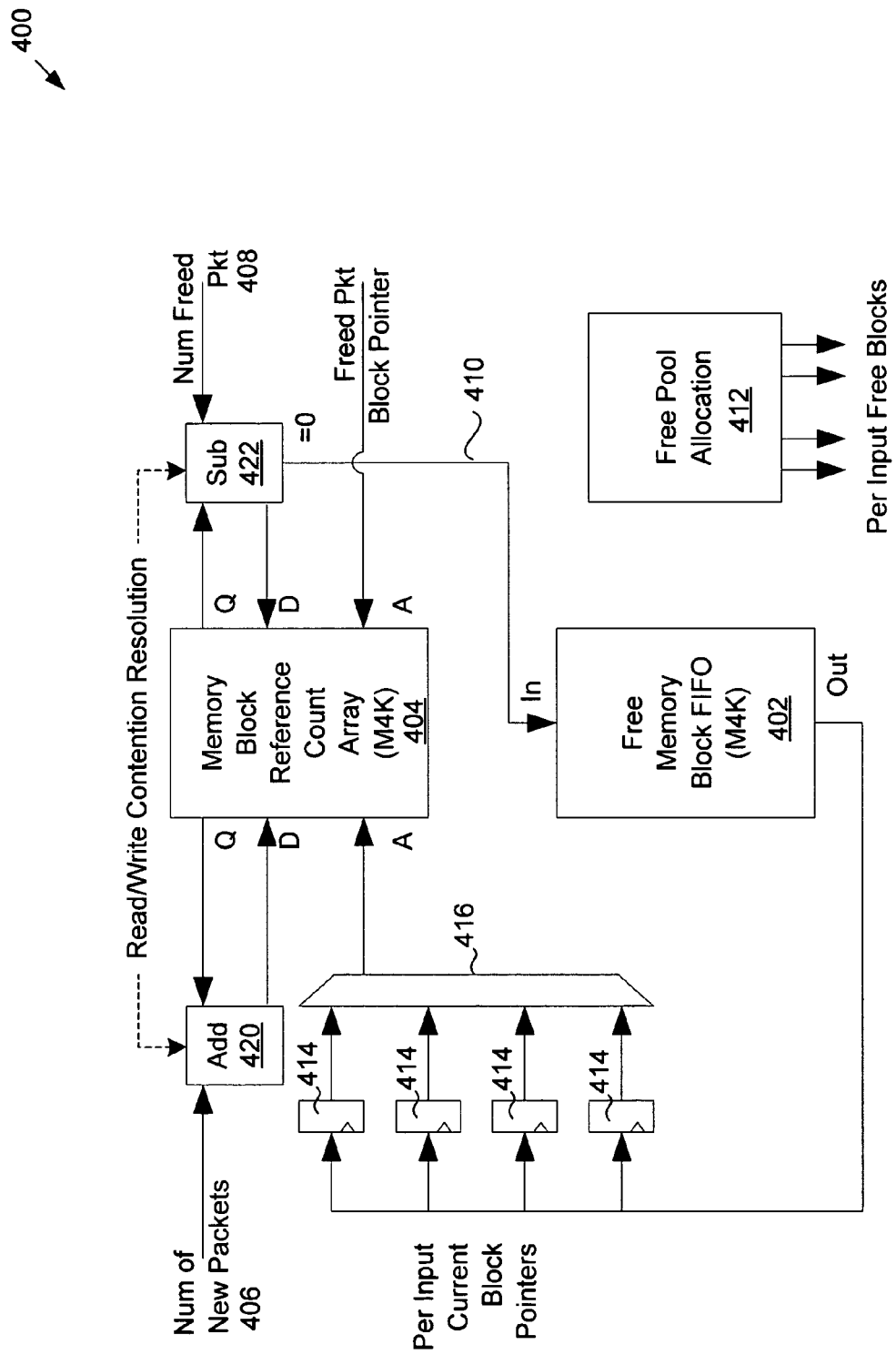
FIG. 4 illustrates an example implementation detail of a Data Buffer Memory Manager according to various embodiments of the present invention.

FIG. 4 illustrates an example implementation detail of a Data Buffer Memory Manager 400 according to various embodiments of the present invention. DBMM 400 manages the allocation of CDB memory blocks to the input ports. In this example, DBMM 400 provides a FIFO of free memory blocks for this purpose. Data from an input port will typically be stored in the linked-list of CDB blocks. When data is written to one CDB block the pointer to the next CDB block may also be stored. If a single packet spans multiple CDB blocks then this chain of next CDB block pointers will be used to link the entire packet. When reading packets from the CDB the next CDB block pointer should be available in time to address the next CDB block while still reading the current block.

In a specific embodiment, for CDB implementations that use one or two parallel MRAM blocks, a 128 byte memory block size (1024 bits) can be used. Since packets may be stored in a linked-list of these data blocks, a 128 byte block requires at least 4 cycles to read completely out of the CDB. If the "next data block" pointer is read along with the first access to the "current data block" then 4 cycles should give sufficient time to send the access back around to start accessing the next data block with pipelining if needed to meet Fmax.

In cases where four parallel MRAM blocks are used, it might be necessary to increase to a 256 byte memory block size, since a 128 byte block size may be limited to a two cycle access for each data block. A two-cycle access may be adequate, depending on how the remaining control logic works out. A 128 byte block size might also be adequate as long as a single block is not accessed in back to back cycles. However, this may be unlikely since a 2-port bridge can split the output accesses between the two ports. As a result, a total of 4 cycles would be provided before the "next" block address would be needed. Since PCI-Express maintains its data flow control on a 16-byte basis, it may be necessary to pack multiple data packets into a single 128-byte block in the CDB. It can be the responsibility of the DBMM to track this.

Returning to FIG. 4, the list of available free memory blocks is kept in a "Free Memory Block FIFO" 402. This FIFO 402 can be initialized with the addresses of all of the blocks at reset time. As packets arrive at the inputs, the memory blocks are assigned to the packets by reading the addresses of the blocks out of the FIFO 402. In the depicted example, available memory blocks are assigned from the "out" end of FIFO 402 to individual ones of the four depicted inputs, each having a transceiver 414. Identification of individual memory blocks assigned to particular inputs is provided to Array 404 via a multiplexer 416, as shown.

Since multiple packets can be held in a single memory block, the count of packets in a given memory block is stored in the "Memory Block Reference Count Array" 404. There can be a given number of equal sized "sub-blocks" within each block. All packets can start on sub block boundaries. Thus, the maximum number of packets contained in a block is the number of sub blocks.

Each time a packet is written (indicated by a signal 406) to a given memory block, the reference count for that block is incremented using an incrementor 420. Whenever that packet is read (indicated by a signal 408) from the CDB and the memory is freed, the reference count for that memory block is decremented using a decrementor 422. If the count is decremented to zero, then the memory block address is written back (e.g., via a signal 410) to Free Memory Block FIFO 402.

Memory Block Reference Count Array 404 may alternatively be implemented as set of valid flags where there is one valid flag per sub block. Whenever a packet is written to a sub block the valid bit is set. When the packet is read from the sub block, the valid bit is reset. When the set of valid bits for a block transitions from non-zero to all zeros, the block is added to Free Memory Block FIFO 402.

Each input (e.g., 208a) can be assigned a certain number of memory blocks at initialization time. A Free Pool Allocation Module 412 can have a counter of available blocks for each input. Whenever a block is assigned to an input, the available block counter for that input will be decremented. Whenever a block that was in use by a particular input is returned to Free Memory Block FIFO 402, the available block counter for that input will be incremented.

With this scheme there is a set number of blocks available to each input interface, however the actual physical blocks of memory are not statically assigned to a given input. It can be up to the individual input interfaces to carve up the available memory pool for each type of virtual input queue that may be in use. This avoids having the DBMM manage separate virtual input queues and may allow the input interface to optimize the offered buffer credits based on current traffic conditions.

Note that this scheme may lead to memory fragmentation. If there are many small packets arriving from one interface and they are scattered among various outputs where one output is slow at reading the packets, then many memory blocks may be partially consumed. Accordingly, some mitigating factors can be considered. These factors include:

Interfaces that issue flow control on a full packet basis, such as HyperTransport, should consider writing only a single packet to a memory block. While this may not fully utilize the memory assigned, it can make the fragmentation less of an issue. The MRAM blocks could be large enough and the typical HyperTransport buffer credit requirements small enough that memory fragmentation should not be an issue.

Most interfaces (including HyperTransport and PCI-Express) manage header credits and data credits separately. The number of header credits can limit the total number of packets received from a given interface and thus put an upper bound on the number of blocks that can be consumed by different packets. For PCI-Express with the large data packet sizes, the total number of blocks assigned to the interface can be much larger than the number of header credits. Thus, either there will still be a large number of free blocks when there are small packets fragmenting the maximum amount of blocks, or there will be a large number of non-fragmented blocks consumed by some relatively large packets.

In general, the MRAM blocks could be fairly large such that some packets may be kept in reserve to offset fragmented packets, while still offering generous buffer credits. (This would involve offering some credits "ahead" of when a fragmented buffer is finally freed.)

Output interfaces can be designed to drain packets automatically from the CDB after a timeout period when the attached component module has stopped responding. This can prevent a malfunctioning component module from locking up the buffer space permanently.

Figure 5:
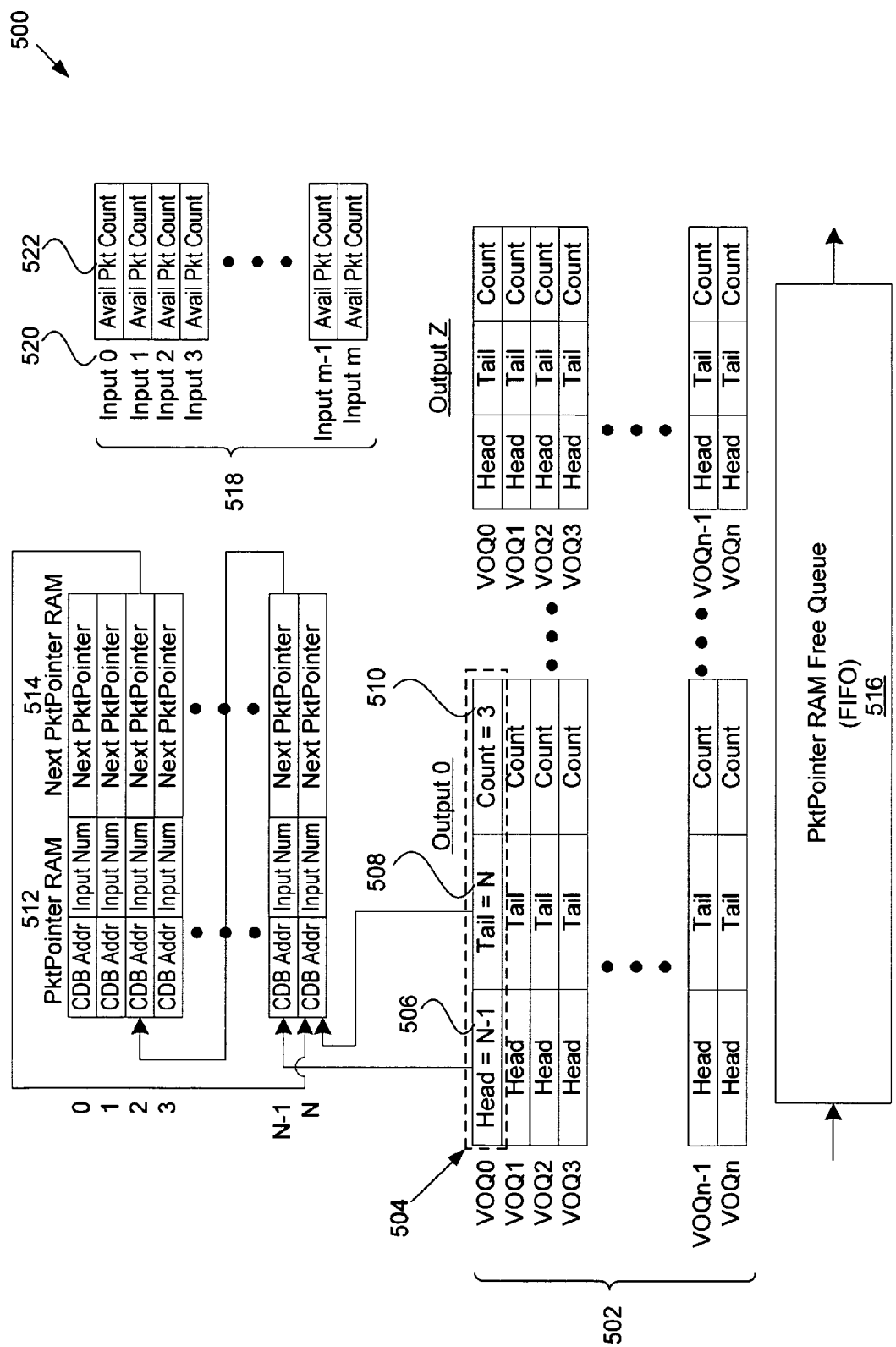
FIG. 5 illustrates an example implementation detail of a Virtual Output Queue Manager according to various embodiments of the present invention.

FIG. 5 illustrates an example implementation detail of a Virtual Output Queue Manager 500 according to various embodiments of the present invention. The VOQM controls multiple virtual queues 502 so that their packets can be delivered to appropriate output buffers in sequence. In this implementation, the VOQM also maintains a tally of the available packet count available to each input of a module.

In the depicted embodiment, VOQM 500 implements multiple virtual queue 502 as linked-list chains of start of packet CDB addresses stored in RAM and/or Register data structures. There is a separate linked list for each queue. A linked-list data structure is used so that a relatively small amount of RAM may be used. There will be fixed number of packets that can be queued in the Packet Switch Module at any one time and this controls the size of the VOQ RAM needed. If instead a VOQ is implemented as a hardware FIFO, then each VOQ FIFO would need to be sized to hold the maximum number of packets. While this is not a preferred approach, it is within the scope of this invention.

VOQM 500 maintains the linked-lists that implement the Virtual Output Queues (VOQ). When a new packet is written to the CDB, the VOQM 500 appends the CDB address of the start of packet to the tail of the appropriate linked-list data structure for the virtual channel to which the packet belongs. When a given output buffer (e.g., 214b) starts reading a packet for a given output queue, the CDB address is removed from the head of the appropriate linked-list and the next CDB address in the chain is made the new head of the VOQ.

The linkage between the structures is shown by example values in Output 0, VOQ0 control block and associated pointers. For each VOQ, a virtual output queue control structure 504 is implemented. This structure contains pointers to the current "Head" 506 of the virtual output queue and also the "Tail" 508 of the virtual output queue. These pointers point to PktPointer RAM 512 entries that make up the queue. There is also a count 510 of how many packets are in the virtual output queue.

PktPointer RAM 512 stores the address of the packet in the CDB. This address typically includes the block and sub block number since a packet should start on a sub block boundary. Associated with each PktPointer RAM 512 entry is the Next PktPointer RAM 514 entry, which contains a pointer to the next PktPointer that is next in the chain of the same virtual output queue. This can be a separate RAM structure since it is logically written at a different time, specifically when the next packet address is written.

VOQM 500 may also include a PktPointer RAM Free Queue 516, which is a FIFO that contains pointers to free locations in PktPointer RAM 512. This FIFO is initialized to contain all of the locations in PktPointer RAM 512.

In the depicted embodiment, VOQM 500 also provides the available packet count to each input port. The available packet count for an input port is decremented when a packet from the input port is added to a VOQ. When a packet is removed from a VOQ the available packet count for the input port that sourced the packet is incremented. The available packet counters can be initialized to an assigned packet count amount for each port.

To further elaborate, VOQM 500 can track a fixed (but design time configurable) number of packets. An Available Packet Counter 522 is maintained for each one of inputs 518. Available Packet Counter 522 is initialized at reset time to the number of packets that the associated input is allowed to have queued in the CDB. The sum of all of the initial Available Packet Counters 522 should be less than or equal to the number of packets the VOQM is configured to track.

When a packet arrives from an input and the corresponding CDB Addr is written to PktPointer RAM 512, the Available Packet Counter for that input is decremented. The number 520 of the Input that sourced the packet is stored under Input Num along with the CDB Addr in the PktPointer RAM. When the Packet is read from the CDB, the Input Number stored in PktPointer RAM 512 is used to select which Packet Available Counter 522 is decremented. The Packet Available Counter value can be sent back to the input component to be used for flow control purposes (e.g., via connection 208$x$2), along with the Available CDB space that is provided by the DBMM (e.g., via connection 208$x$1).

A Virtual Output Queue may operate as follows when new packets are written to the CDB: 1) a new PktPointer RAM location is obtained from PktPointer RAM Free Queue 516; 2) the CDB address of the packet is written to the new Pkt-Pointer RAM 512 location and if the target virtual output queue count 510 is greater than 0, the Next PktPointer RAM 514 is addressed by the current Tail 508 location and the new PktPointer RAM 512 location is written; 3) if the target virtual output queue has a current count 510 of 0, the new PktPointer RAM 512 location is written to both the Head 506 and Tail 508 pointers; 4) if the target virtual output queue has at least one packet in it, then the new PktPointer RAM 512 location is written to the Tail 508 pointer; 5) the virtual output queue count 510 is incremented.

On the other hand, the Virtual Output Queue may operate as follows when Packets are read: 1) the virtual output queue Head 506 pointer is used to read the CDB address from PktPointer RAM 512; 2) the Next PktPointer is read from the Next PktPointer RAM 514; 3) the original Head 506 Pkt-Pointer value is written to the PktPointer RAM Free Queue 516; 4) the Head 506 Pointer is replaced with the Next Pkt-Pointer value; 5) the virtual output queue count 510 is decremented.

Figure 6:
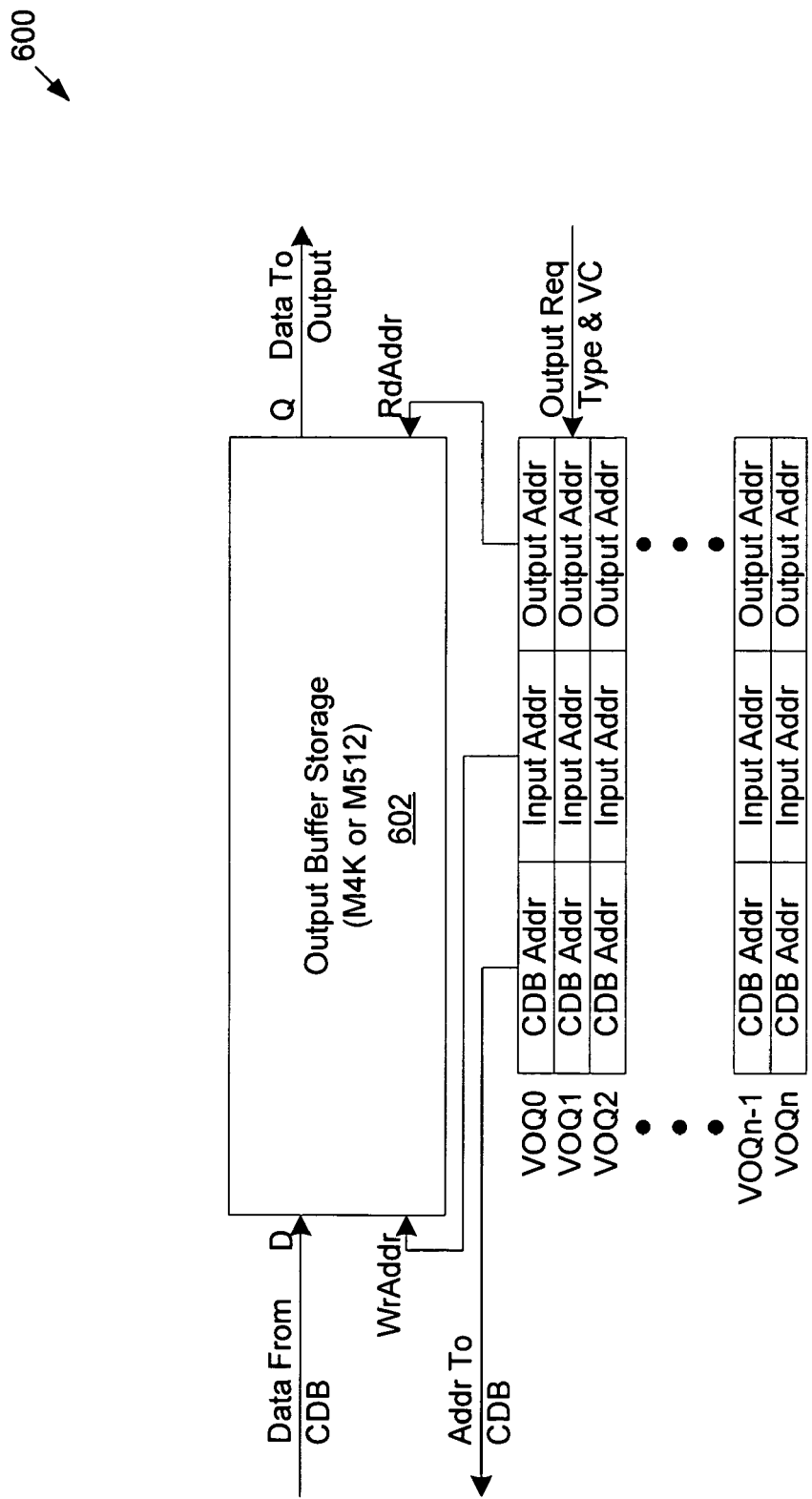
FIG. 6 illustrates an example implementation detail of an Output Buffer according to various embodiments of the present invention.

FIG. 6 illustrates an example implementation detail of an output buffer 600 according to various embodiments of the present invention. For each output interface, there could be several virtual output queues. For example, in PCI Express, there would be virtual output queues for each type of packet (e.g., Posted, Non-Posted, and Response) and each virtual channel of those packet types. Since the CDB may not be sure which type of packet the output interface will want next, there could be some amount of latency to wait for a CDB access slot and the resulting MRAM access. This could result in gaps in the output data stream. As such, the output buffers can instead pre-fetch data for some or all of the virtual output queues.

When the output interface requests a given virtual output queue and the output buffer has it pre-fetched already, the data can be supplied nearly immediately. The output buffer 600 can supply the data until the next CDB access can be made and the output buffer space for that virtual output queue can be replenished. Thus, output buffer 600 should have enough room in output buffer storage 602 for each of the possible virtual output queues to have enough data to supply the output interface until the CDB access can be guaranteed. This may likely require the output buffer storage 602 to be implemented in M4K blocks, though a slower speed interface with only a single virtual channel (e.g., VOQ) may be adequate with M512 based blocks.

Figure 7A:
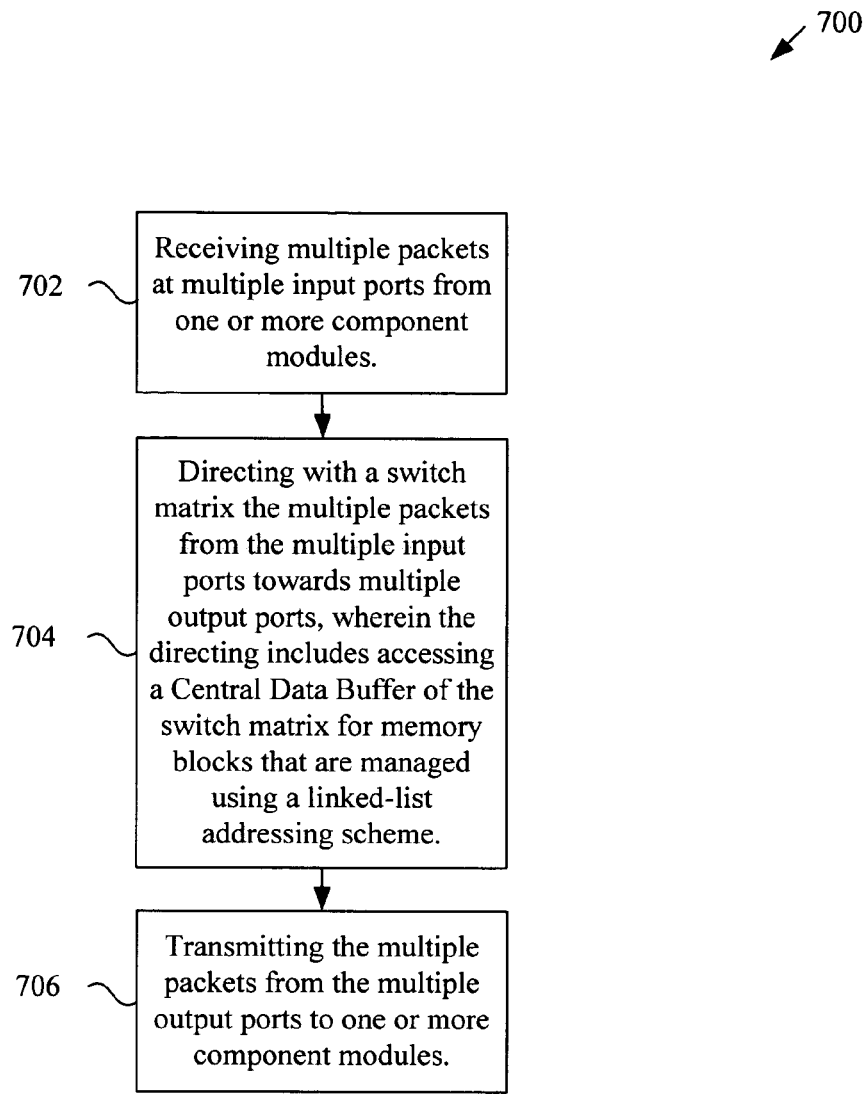
FIG. 7A is a flowchart of switching packets between multiple component modules according to various embodiments of the present invention.

FIG. 7A is a flowchart 700 of switching packets between multiple component modules according to various embodiments of the present invention. Beginning at operation 702, receiving multiple packets at multiple input ports from one or more component modules is performed.

Next, directing with a switch matrix the multiple packets from the multiple input ports towards multiple output ports can be performed in operation 704, wherein the directing includes accessing a Central Data Buffer of the switch matrix for memory blocks that are managed using an addressing scheme. Operation 704 will be described further below in reference to FIGS. 7B and 7C. Generally, the multiple input ports and/or the multiple output ports may be given access to the Central Data Buffer according to an access scheme. In one embodiment, a round robin access scheme is used. In another embodiment, a weighted round robin access scheme is used.

In general, the memory blocks of the Central Data Buffer can be managed by providing a linked-list of available memory blocks from which the multiple packets can be written to. For example, the switch matrix can include a Data Buffer Memory Manager operable to allocate the memory blocks to the plurality of input ports based on a linked-list of available memory blocks. The Data Buffer Memory Manager can be further operable to maintain a count of memory blocks assigned to each of the plurality of input ports. The Data Buffer Memory Manager can also be operable to maintain status of each of the memory blocks as being in either an available state or an used state and maintain count of the memory blocks that are in the available states. In some instances, the Data Buffer Memory Manager is further operable to maintain count of individual packet portions within each of the memory blocks such that memory blocks are in the available states when their count of individual packet portions equals to a zero value and memory blocks are in the used states when the count of individual packet portions equals to a non-zero value.

However, the memory blocks can also be managed by providing a linked-list of memory blocks from which the plurality of packets can be read. For example, the switch matrix can include a Virtual Output (Channel) Queue Manager operable to maintain a list of packets from the multiple packets designated for a virtual channel on one of the multiple output ports. Typically, the list (e.g., control structure 504) is a linked-list of packet headers or start of packet addresses. The Virtual Output (Channel) Queue Manager can be further operable to maintain a count of packets stored within the Central Data Buffer. According to one embodiment, the Virtual Output (Channel) Queue Manager can be further operable to maintain a count of available packet space within the Central Data Buffer for each of the multiple input ports, the count based on packets received from each of the multiple input ports, packets transmitted from each of the multiple output ports, and available packet space assigned for each of the multiple input ports.

The switch matrix may further include multiple input buffers, wherein each input buffer is coupled to a corresponding one of the multiple input ports. As such, one of the multiple input ports can be used for receiving a portion of the multiple packets into a corresponding input buffer. Similarly, the switch matrix may further include multiple output buffers, wherein each output buffer is coupled to a corresponding one of multiple output ports. As such, one of the multiple output ports can be used for transmitting a portion of the plurality of packets from a corresponding output buffer. In one embodiment, the accessing of the Central Data Buffer includes pre-fetching a portion of the multiple packets from the Central Data Buffer by one of the multiple output buffers; storing the portion of the multiple packets in the one of the multiple output buffers; and transmitting from the one of the multiple output buffers the portion of the multiple packets when a notification is provided (e.g., sent by a component module where the packets are destined) for their transmittal.

Finally, in operation 706, transmitting the multiple packets from the multiple output ports to one or more component modules can be performed. Due to many aspects of the present invention, flexible and efficient mechanisms and techniques for switching packets in a system can be realized. For example, the general purpose Packet Switch Module is configured to switch packets between one or more component modules on a first network protocol and one or more component modules on a second network protocol, wherein the first and second network protocols are the same. However, it will be appreciated by those skilled in the art that any conventional mechanism or technique for translating different network protocols (e.g., where the first and second network protocols are not the same) can be separately provided and/or integrated with the Packet Switch Module. The first and second network protocols can be Ethernet, Fiber Channel, PCI Express, Advance Switching, etc. For another example, the linked-list addressing scheme that is integrated with the Central Data Buffer facilitates the switching of either fixed or variable length packets. In sum, packets associated with fixed/variable lengths, non-specific applications/designs, and/or non-specific protocols can be processed.

Figure 7B:
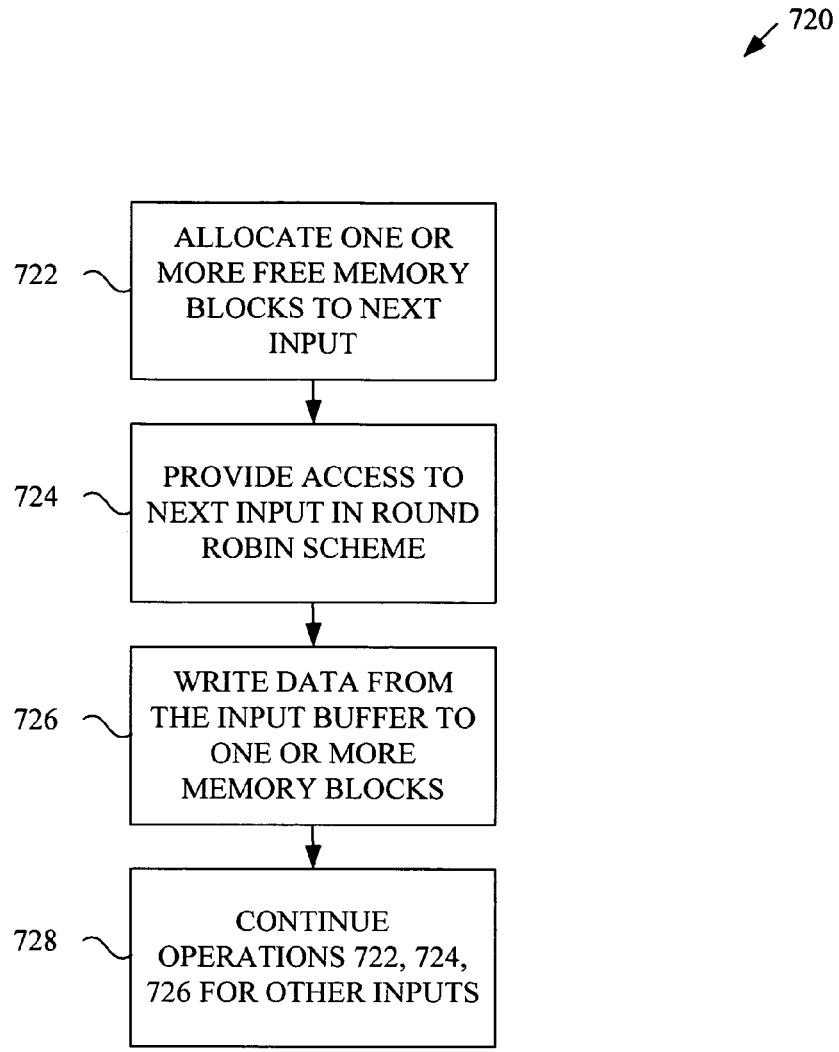
FIG. 7B is a flowchart of directing data between the input buffer and the Central Data Buffer according to various embodiments of the present invention.

FIG. 7B is a flowchart 720 of directing data between the input buffer and the Central Data Buffer according to various embodiments of the present invention. Beginning at operation 722, allocating one or more free memory blocks to next input may be performed. Since each input port can be configured to have a set number of CDB blocks assigned to it, a Data Buffer Memory Manager can maintain a count of CDB blocks currently available for each input port. The currently available CDB block count can be provided to the input port logic interface.

Next, providing access to next input in round robin scheme can be performed in operation 724. As mentioned earlier, CDB can be configured so that in a given input cycle, an entire input data bus can be dedicated to a given input port. Some embodiments employ a round robin access scheme that guarantees specified line rates for each input. The round robin access scheme can be defined by scheduling configuration parameters. Briefly, the access time available to each port employed in the round robin method can be a fixed or weighted value.

Next writing data from the input buffer to one or more memory blocks can be performed in operation 726. In general, when an input port needs a CDB block to write data to, one of the currently available CDB blocks can be assigned to it and an available CDB block counter for that port will be decremented. The CDB block then will be put in the used state. Afterwards, continuing with operations 722, 724, and 726 for other inputs may be performed in operation 728.

Figure 7C:
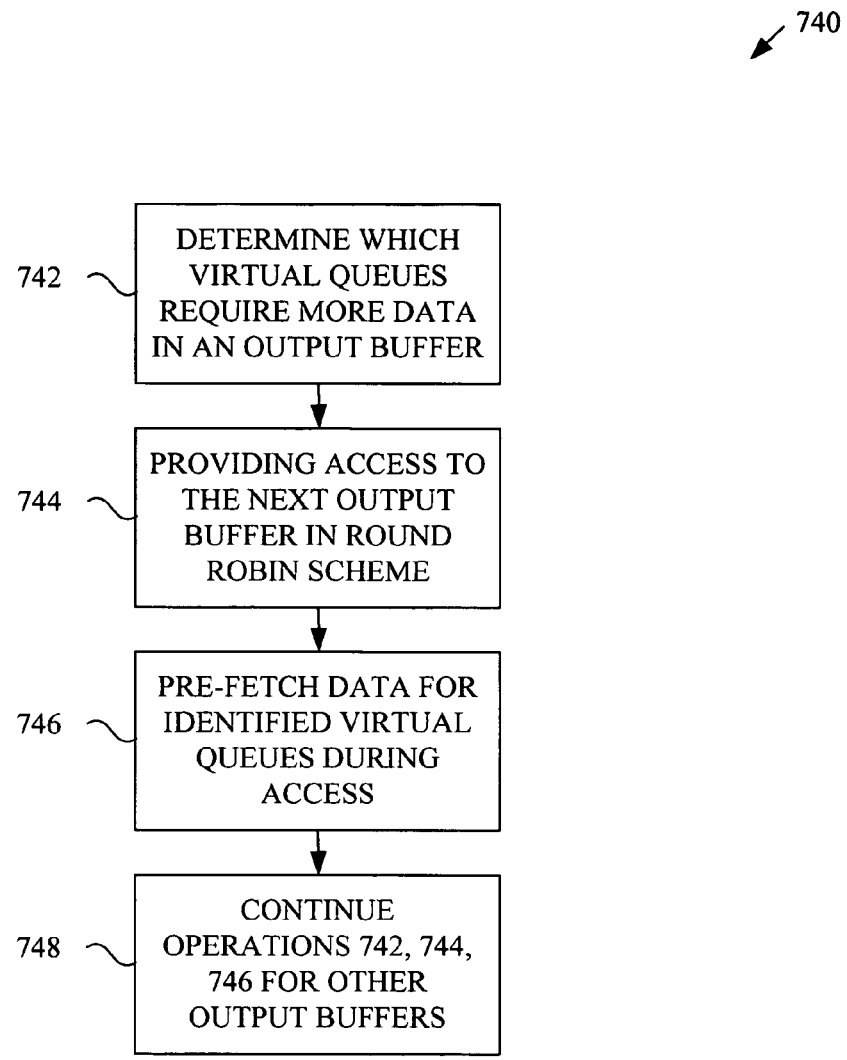
FIG. 7C is a flowchart of directing data between the Central Data Buffer and the output buffer according to various embodiments of the present invention.

FIG. 7C is a flowchart 740 of directing data between the Central Data Buffer and the output buffer according to various embodiments of the present invention. Beginning at operation 742, determining which virtual queues require more data in an output buffer can be performed. Since an indirect addressing scheme is used, the packets need not be freed up in a first-in-first-out (FIFO) order. Some packets may be destined for outputs that are not congested and thus could be freed up before packets that arrived earlier that were destined for more congested outputs. As such, head of line blocking can be avoided.

Next, providing access to the next output buffer in round robin access scheme can be performed in operation 744. A similar scheme as described for the input side of the CDB can be used for the output side of the CDB. Thus, an output data bus can be dedicated to one output port interface in a given cycle. The output round robin access scheme can also be provided by the scheduling configuration parameters. The CDB clock frequency, data width and round robin scheduling can be custom designed for the set of busses connected to a given switch.

Next, pre-fetching data for identified virtual queues during access can be performed in operation 746. Since the CDB may not be sure which type of packet the output interface will want next, there could be some amount of latency to wait for a CDB access slot and the resulting MRAM access. This could result in gaps in the output data stream. As such, the output buffers can instead pre-fetch data for some or all of the virtual output queues. When the output interface requests a given virtual output queue and the output buffer has it pre-fetched already, the data can be supplied nearly immediately. The output buffer can supply the data until the next CDB access can be made and the output buffer space for that virtual output queue can be replenished. Afterwards, continuing with operations 742, 744, and 746 for other output buffers may be performed in operation 748.

Figure 8:
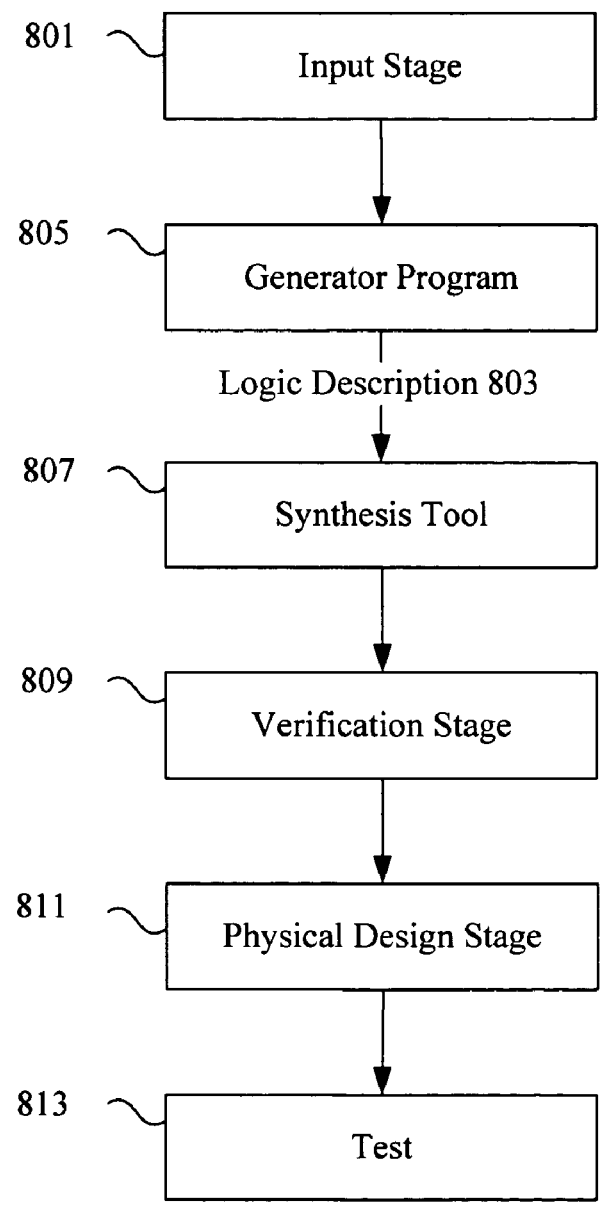
FIG. 8 is a diagrammatic representation showing implementation of an electronic device.

FIG. 8 is a diagrammatic representation showing implementation of an electronic device (e.g., programmable chip) using a programmable chip tool. An input stage 801 receives selection information typically from a user for logic such as a processor core as well as other components such as a Packet Switch Module to be implemented on an electronic device. A generator program 805 creates a logic description 803 and provides the logic description along with other customized logic to any of a variety of synthesis tools, place and route programs, and logic configuration tools to allow a logic description to be implemented on an electronic device.

In one example, an input stage 801 often allows selection and parameterization of components to be used on an electronic device. In some examples, components provided to an input stage include intellectual property functions, mega-functions, and intellectual property cores. The components may be stored and retrieved from a library or database. The input stage 801 may be a graphical user interface using wizards for allowing efficient or convenient entry of information. The input stage may also be a text interface or a program reading a data file such as a spreadsheet, database table, or schematic to acquire selection information. The input stage 801 produces an output containing information about the various components selected.

In typical implementations, the generator program 805 can identify the selections and generate a logic description with information for implementing the various components. The generator program 805 can be a Perl script creating HDL files such as Verilog, Abel, VHDL, and AHDL files from the module information entered by a user. According to various embodiments, the generator program 805 also provides information to a synthesis tool 807 to allow HDL files to be automatically synthesized. In some examples, a logic description is provided directly by a designer. Some of the available synthesis tools are Leonardo Spectrum, available from Mentor Graphics Corporation of Wilsonville, Oreg., Synplify available from Synplicity Corporation of Sunnyvale, Calif., and Quartus II available from Altera Corporation of San Jose, Calif. The HDL files may contain technology specific code readable only by a synthesis tool. The HDL files at this point may also be passed to a simulation tool.

As will be appreciated by one of skill in the art, the input stage 801, generator program 805, and synthesis tool 807 can be separate programs. The interface between the separate programs can be a database file, a log, or simply messages transmitted between the programs. For example, instead of writing a file to storage, the input stage 801 can send messages directly to the generator program 805 to allow the generator program to create a logic description 803. Similarly, the generator program can provide information directly to the synthesis tool instead of writing HDL files. Similarly, input stage 801, generator program 805, and synthesis tool 807 can be integrated into a single program.

A user may select various components and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 807.

A verification stage 809 typically follows the synthesis stage 807. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 809, the synthesized netlist file can be provided to physical design tools 811 including place and route and configuration tools. A place and route tool typically locates logic cells on specific logic elements of a target hardware device and connects wires between the inputs and outputs of the various logic elements in accordance with logic required to implement an electronic design. The device can also be physically tested at 813.

For programmable logic devices, a programmable logic configuration stage can take the output of the place and route tool to program the logic device with the user selected and parameterized components. According to various embodiments, the place and route tool and the logic configuration stage are provided in the Quartus II, available from Altera Corporation of San Jose, Calif.

As noted above, different stages and programs can be integrated in a variety of manners. According to one embodiment, the input stage 801, the generator program 805, the synthesis tool 807, the verification tools 809, and physical design tools 811 are integrated into a single program. The various stages are automatically run and transparent to a user. The program can receive the user-selected components, generate a logic description depicting logic for implementing the various selected components, and implement the electronic device. As will be appreciated by one of skill in the art, HDL files and EDF files are mere examples of a logic description. Other file formats as well as internal program representations are other examples of a logic description.

Figure 9:
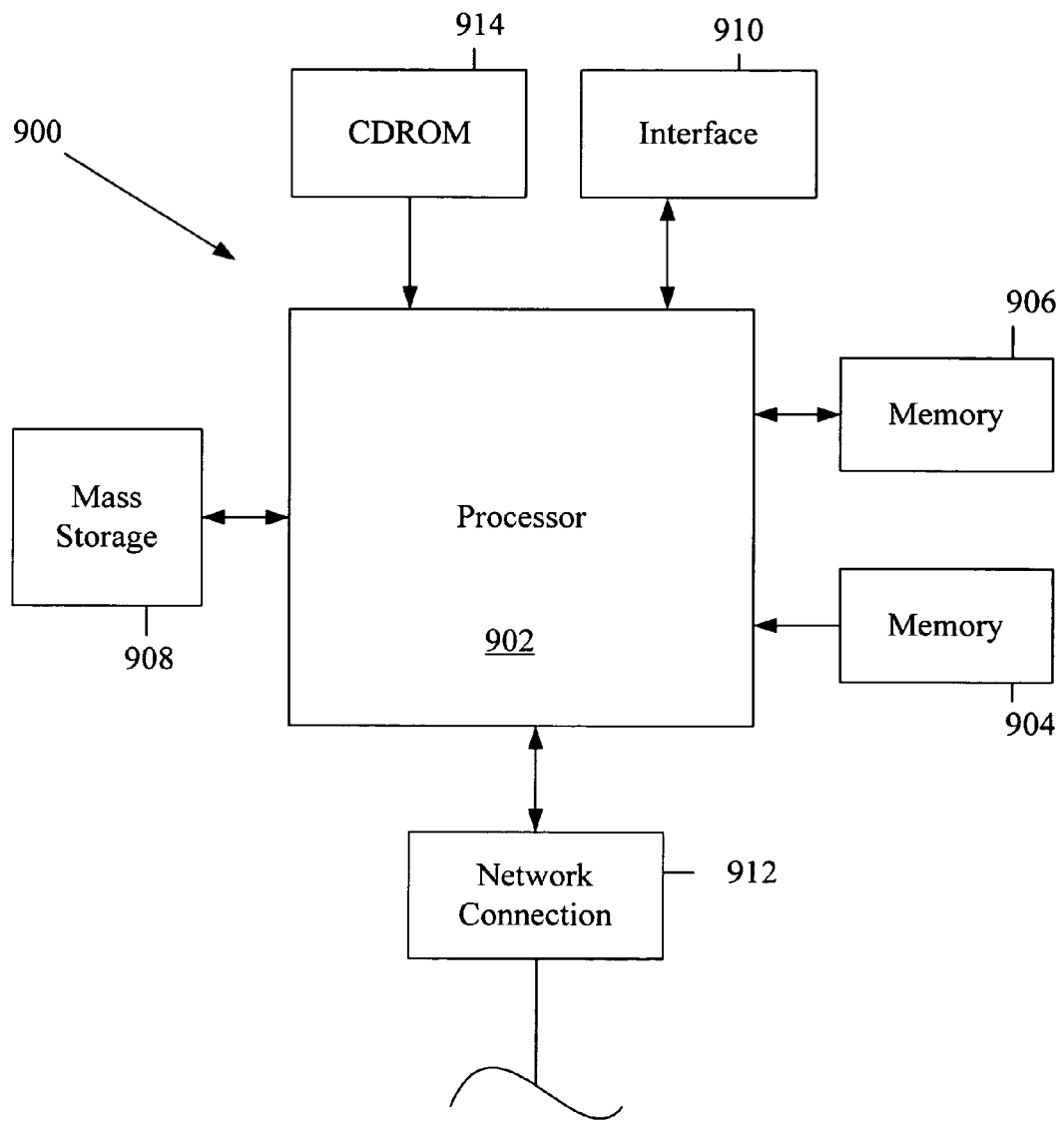
FIG. 9 is a diagrammatic representation of a system that can be used to implement the electronic device.

FIG. 9 illustrates a computer system suitable for implementing various embodiments of the present invention. The computer system 900 includes any number of processors 902 (also referred to as central processing units, or CPUs) that are coupled to devices including memory 906 (typically a random access memory, or "RAM"), memory 904 (typically a read only memory, or "ROM"). As is well known in the art, memory 904 acts to transfer data and instructions uni-directionally to the CPU and memory 906 is used typically to transfer data and instructions in a bi-directional manner.

Both of these memory devices may include any suitable type of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than memory. The mass storage device 908 can be used to hold a library or database of prepackaged logic or intellectual property functions, as well as information on generating particular configurations. It will be appreciated that the information retained within the mass storage device 908, may, in appropriate cases, be incorporated in standard fashion as part of memory 906 as virtual memory. A specific mass storage device such as a CD-ROM 914 may also pass data uni-directionally to the CPU.

CPU 902 is also coupled to an interface 910 that includes one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Video monitors can be used to display wizards and subwizards to a user. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. It should be noted that the system 900 may also be associated with devices for transferring completed designs onto a programmable chip. The above-described devices and materials will be familiar to those of skill in the computer hardware and software arts.

The hardware elements described above may be configured to act as multiple software modules for performing the operations of this invention. For example, instructions for running a tool, generator program, input stage (e.g., a wizard), and/or compiler may be stored on mass storage device 908 or 914 and executed on CPU 902 in conjunction with primary memory 906.

It should be noted that the present invention provides many advantages. For instance, a reusable general-purpose Packet Switch Module for use in programmable devices is provided. It is configurable to cover a wide range of applications. This can minimize or even eliminate the need to custom design switch modules and thus reduce the time to market for these programmable devices. The Packet Switch Module is buffered which reduces or eliminates the need for buffering in the attached ports/components. The switch module supports variable length packets directly. The central memory based buffering has excellent bandwidth characteristics, which is easily configurable for different applications. Multiple virtual channels are supported for each physical port to further optimize performance, reduce external buffering requirements, and increase the number of applications the switch can be used for. For instance, the multiple virtual channels may be used for quality of service type purposes.

In some embodiments, the Packet Switch Module can be viewed as having minimal knowledge of the internals of the packets that are being switched and buffered except as noted otherwise herein. Attached component modules need limited or no internal buffering since the Packet Switch Module can be configured to provide buffering at line rates for both the inputs and outputs. Each input has it own configurable storage pool and the Packet Switch Module provides the current amount of available space in that pool. In this way, the attached component module on the input side can then further subdivide that space into as many virtual input queues as needed and implement the required backpressure or flow control mechanisms to prevent overrunning the available pool. On the other hand, each output can have multiple virtual output queues. The attached component module of the output side can select any of the virtual queues based on its local flow control information.

The Packet Switch Module can be highly configurable with the following beneficial configuration options: 1) number of input and output ports; 2) bit width of data path of each input and output port; 3) amount of buffer space allocated per input port; 4) number of virtual output queues for each output port; 5) scheduling of port access to the central memory. The Packet Switch Module can provide improved bandwidth characteristics of a central memory switch into the PLD space. It is scalable as needed with a given FPGA technology. For example, it is configurable (e.g., number of ports, data path widths, amount of buffering, scheduling, etc.) to support a wide range of applications. Accordingly, the Packet Switch Module provides a general-purpose re-usable buffered switch fabric that can speed the time to market of user designs.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A packet switch module, comprising:
a plurality of input ports operable to receive a plurality of packets from a first component module;
a plurality of output ports operable to transmit the plurality of packets to a second component module; and
a switch matrix for directing the plurality of packets between the plurality of input ports and the plurality of output ports, said switch matrix comprises a Central Data Buffer with memory blocks operable to store temporarily the plurality of packets after their receipt by the plurality of input ports, wherein the memory blocks are managed in an addressing scheme, wherein free memory blocks are made available to any input port requiring packet buffering; and wherein said switch matrix further comprises a virtual output queue manager configured to maintain a plurality of virtual channels for at least one output port by maintaining a feature including a list of packets from the multiple packets designated for a virtual channel on the at least one output port, a count of packets stored within the Central Data Buffer, or a count of available packet space within the Central Data Buffer for the at least one output port.

2. The packet switch module as recited in claim 1, wherein the packet switch module is configured to handle packets of variable lengths.

3. The packet switch module as recited in claim 1, wherein the addressing scheme allows the memory blocks to be reused in an order different from that in which they are initially used by the plurality of packets.

4. The packet switch module as recited in claim 1, wherein the packet switch module is implemented using one or more input port configuration parameters specified by a user during an electronic design automation design procedure, wherein the one or more specified input port configuration parameters are selected from the group consisting of a data path bit width for an input port, an input port FIFO depth, an amount of Central Data Buffer space assigned to the input port, and a total number of packets that can be queued from the input port at any given time.

5. The packet switch module as recited in claim 1, wherein the packet switch module is implemented using one or more output port configuration parameters specified by a user during an electronic design automation design procedure, wherein the one or more specified output port configuration parameters are selected from the group consisting of a data path bit width for an output port, number of virtual channel queues for an output port, and size of virtual FIFO for each of the virtual channel queues.

6. The packet switch module as recited in claim 1, wherein the packet switch module is implemented using one or more general configuration parameters specified by a user during an electronic design automation design procedure, wherein the one or more specified general configuration parameters are selected from the group consisting of a Central Data Buffer bit width, a number of input ports, a number of output ports, scheduling of input port access to the Central Data Buffer, scheduling of output port access to the Central Data Buffer, a bit width of Atlantic address bus signal, and a bit width of packet length.

7. The packet switch module as recited in claim 1, wherein the Central Data Buffer is operable to allow access by the plurality of input ports and/or the plurality output ports in a fixed round robin access scheme.

8. The packet switch module as recited in claim 1, wherein the Central Data Buffer is operable to allow access by the plurality of input ports and/or the plurality of output ports in a weighted round robin access scheme.

9. The packet switch module as recited in claim 1, wherein the switch matrix further comprises:
a plurality of input buffers, wherein each input buffer is coupled to a corresponding one of the plurality of input ports and is available for receiving packets from its corresponding input port.

10. The packet switch module as recited in claim 9, wherein the input buffers are FIFOs.

11. The packet switch module as recited in claim 1, wherein the switch matrix further comprises:
a plurality of output buffers, wherein each output buffer is coupled to a corresponding one of the plurality of output ports and is available for transmitting packets to its output port.

12. The packet switch module as recited in claim 11, wherein the output buffers are arranged to buffer packets for a plurality of virtual channels.

13. The packet switch module as recited in claim 11, wherein one of the plurality of output buffers has associated logic operable to pre-fetch packets from the Central Data Buffer, store those packets, and transmit them when a notification is sent by the second component module for their transmittal.

14. The packet switch module as recited in claim 11, wherein each output port is configured to pre-fetch packets from memory blocks of the Central Data Buffer for a plurality of virtual channels.

15. The packet switch module as recited in claim 14, wherein each output port is configured and sized to simultaneously store packets for each virtual channel.

16. The packet switch module as recited in claim 1, wherein the switch matrix further comprises:
a Data Buffer Memory Manager operable to allocate the memory blocks to the plurality of input ports based on which memory blocks are currently available and independent of the order in which said memory blocks were previously allocated to input ports.

17. The packet switch module as recited in claim 16, wherein the Data Buffer Memory Manager is further operable to maintain a count of memory blocks assigned to each of the plurality of input ports.

18. The packet switch module as recited in claim 17, wherein the Data Buffer Memory Manager is further operable to maintain status of each of the memory blocks as being in either an available state or an used state and maintain count of the memory blocks that are in the available states.

19. The packet switch module as recited in claim 18, wherein the Data Buffer Memory Manager is further operable to maintain count of individual packets within each of the memory blocks such that memory blocks are in the available states when their count of individual packets equals to a zero value and memory blocks are in the used states when the count of individual packets equals to a non-zero value.

20. The packet switch module as recited in claim 1, wherein the switch matrix further comprises:
a Virtual Channel Queue Manager operable to maintain a list of packets from the plurality of packets that are designated for a virtual channel on one of the plurality of output ports.

21. The packet switch module as recited in claim 20, wherein the list is arranged as a linked-list of packet headers.

22. The packet switch module as recited in claim 20, wherein the Virtual Channel Queue Manager is further operable to maintain a count of packets stored within the Central Data Buffer.

23. The packet switch module as recited in claim 20, wherein the Virtual Channel Queue Manager is further operable to maintain a count of available packet space within the Central Data Buffer for each of the plurality of input ports, the count based on packets received from each of the plurality of input ports, packets transmitted from each of the plurality of output ports, and available packet space assigned to each of the plurality of input ports.

24. A method of producing an electronic device comprising a packet switch module, the method comprising:
(a) receiving instructions for programming the packet switch module onto a programmable electronic device, wherein the packet switch module comprises:
a plurality of input ports operable to receive a plurality of packets from a first component module;
a plurality of output ports operable to transmit the plurality of packets to a second component module; and
a switch matrix for directing the plurality of packets between the plurality of input ports and the plurality of output ports, wherein the switch matrix comprises a Central Data Buffer with memory blocks operable to store temporarily the plurality of packets after their receipt by the plurality of input ports, wherein the memory blocks are managed in an addressing scheme, wherein free memory blocks are made available to any input port requiring packet buffering and wherein said switch matrix further comprises a virtual output queue manager configured to maintain a plurality of virtual channels for at least one output port by maintaining a feature including a list of packets from the multiple packets designated for a virtual channel on the at least one output port, a count of packets stored within the Central Data Buffer, or a count of available packet space within the Central Data Buffer for the at least one output port; and
(b) executing the instructions to thereby incorporate the packet switch module into the programmable electronic device.

25. The method of claim 24, further comprising:
receiving user inputs specifying parameters for the packet switch module, and
using the user inputs to define hardware structure for the packet switch module.

26. The method of claim 25, wherein the parameters comprise one or more of data path bit width, FIFO depth, assignment of Central Data Buffer space, and total number of packets for queuing, number of virtual channel queues, size of virtual FIFO for each of the virtual channel queues, Central Data Buffer bit width, number of input ports, number of output ports, scheduling of input port access to the Central Data Buffer, scheduling of output port access to the Central Data Buffer, bit width of Atlantic address bus signal, and bit width of packet length.

27. The method of claim 24, wherein incorporating the packet switch module onto the electronic device comprises programming the module onto a programmable device.

28. A computer program product comprising a non-transitory machine readable medium on which is provided instructions for incorporating a packet switch module onto an electronic device, wherein the packet switch module comprises:
a plurality of input ports operable to receive a plurality of packets from a first component module;

a plurality of output ports operable to transmit the plurality of packets to a second component module; and a switch matrix for directing the plurality of packets between the plurality of input ports and the plurality of output ports, wherein the switch matrix comprises a Central Data Buffer with memory blocks operable to store temporarily the plurality of packets after their receipt by the plurality of input ports, wherein the memory blocks are managed in an addressing scheme, wherein free memory blocks are made available to any input port requiring packet buffering; and wherein said switch matrix further comprises a virtual output queue manager configured to maintain a plurality of virtual channels for at least one output port by maintaining a feature including a list of packets from the multiple packets designated for a virtual channel on the at least one output port, a count of packets stored within the Central Data Buffer, or a count of available packet space within the Central Data Buffer for the at least one output port.

29. The computer program product of claim 28, further comprising:
instructions for receiving user inputs specifying parameters for the packet switch module, and
instructions for using the user inputs to define hardware structure for the packet switch module.

30. The computer program product of claim 29, wherein the parameters comprise one or more of data path bit width, FIFO depth, assignment of Central Data Buffer space, and total number of packets for queuing, number of virtual channel queues, size of virtual FIFO for each of the virtual channel queues, Central Data Buffer bit width, number of input ports, number of output ports, scheduling of input port access to the Central Data Buffer, scheduling of output port access to the Central Data Buffer, bit width of Atlantic address bus signal, and bit width of packet length.

31. The computer program product of claim 28, wherein incorporating the packet switch module onto the electronic device comprises programming the module onto a programmable device.

32. A programmable chip, comprising:
a packet switch module interconnecting a first component module and a second component module, the packet switch module comprising:
a plurality of input ports operable to receive a plurality of packets from the first component module;
a plurality of output ports operable to transmit the plurality of packets to the second component module; and
a switch matrix for directing the plurality of packets between the plurality of input ports and the plurality of output ports, wherein the switch matrix comprises a Central Data Buffer with memory blocks operable to store temporarily the plurality of packets after their receipt by the plurality of input ports, wherein the memory blocks are managed in an indirect addressing scheme, wherein free memory blocks are made available to any input port requiring packet buffering and wherein said switch matrix further comprises a virtual output queue manager configured to maintain a plurality of virtual channels for at least one output port by maintaining a feature including a list of packets from the multiple packets designated for a virtual channel on the at least one output port, a count of packets stored within the Central Data Buffer, or a count of available packet space within the Central Data Buffer for the at least one output port.

33. The programmable chip of claim 32, further comprising:
the first component module; and
the second component module.

34. A method of switching packets, comprising:
receiving a plurality of packets from a first component module at a plurality of input ports;
dedicating, within a switch matrix, a plurality of sets of memory blocks to the input ports;
directing, with the switch matrix, the plurality of packets from the plurality of input ports towards a plurality of output ports,
wherein the directing comprises accessing a Central Data Buffer of the switch matrix for one or more of the memory blocks that are managed using an addressing scheme including making available one or more of the memory blocks that are free to any input port requiring packet buffering;
maintaining a count of a number of packets within one of the memory blocks of one of the dedicated sets of memory blocks;
wherein the directing further comprises buffering packets from one or more of the memory blocks at an output buffer for a plurality of virtual channels, wherein the output buffer is separate from the virtual channels; and
transmitting the plurality of packets to a second component module at the plurality of output ports.

35. The method of switching packets as recited in claim 34, wherein the accessing is done by the plurality of input ports according to a round robin access scheme.

36. The method of switching packets as recited in claim 34, wherein the accessing is done by the plurality of output ports according to a round robin access scheme.

37. The method of switching packets as recited in claim 34, wherein one or more of the memory blocks are managed by providing a FIFO list of one or more of the memory blocks that are available to which the plurality of packets can be written.

38. The method of switching packets as recited in claim 34, wherein one or more of the memory blocks are managed by providing a linked-list of one or more of the memory blocks from which the plurality of packets can be read.

39. The method of switching packets as recited in claim 34, wherein the directing further comprises:
storing temporarily the plurality of packets in one or more of the memory blocks.

40. The method of switching packets as recited in claim 34, wherein the dedicating the plurality of sets of memory blocks comprises limiting at all times, for each of the input ports, a number of one or more of the memory blocks associated with the input port.

41. The method of switching packets as recited in claim 40, further comprising
storing, within a first one of the input ports, a first packet designated to be sent to a first one of the output ports;
storing, within a second one of the input ports, a second packet contending for first one of the output ports;
storing within the first input port, a third packet designated to be sent to a second one of the output ports that is available.

42. A method of switching packets comprising:
receiving a plurality of packets from a first component module at a plurality of input ports;
directing, with a switch matrix, the plurality of packets from the plurality of input ports towards a plurality of output ports, wherein the directing comprises accessing a Central Data Buffer of the switch matrix for one or more memory blocks that are managed using an addressing scheme including making free one or more of the memory blocks available to any input port requiring packet buffering, and buffering packets from one or more of the memory blocks at an output buffer for a plurality of virtual channels, wherein the output buffer is separate from the virtual channels; and transmitting the plurality of packets to a second component module at the plurality of output ports, wherein the accessing is done by the plurality of input ports according to a round robin access scheme, the accessing comprises:

pre-fetching a portion of the plurality of packets from the Central Data Buffer by one of a plurality of output buffers;

storing the portion of the plurality of packets in the one of the plurality of output buffers; and transmitting from the one of the plurality of output buffers the portion of the plurality of packets when a notification is sent by the second component module for their transmittal.

* * * * *